United States Patent [19]

Dizon et al.

[11] Patent Number: 4,463,227

[45] Date of Patent: Jul. 31, 1984

[54] MOUNTING FOR AN ARTICLE WHICH PERMITS MOVEMENT THEREOF BETWEEN INACCESSIBLE AND ACCESSIBLE POSITIONS

[75] Inventors: Edmund S. Dizon, Chicago; Joseph P. Moninski, Jr., Northbrook, both of Ill.

[73] Assignee: S&C Electric Company, Chicago, Ill.

[21] Appl. No.: 346,432

[22] Filed: Feb. 5, 1982

[51] Int. Cl.³ .......................... H01H 9/00; H02B 1/04
[52] U.S. Cl. .................................... 200/50 A; 361/347
[58] Field of Search ............ 200/50 A, 293; 337/196; 361/335, 338, 339, 346–351, 353, 357, 358; 312/271, 272, 276, 321, 322, 323

[56] References Cited

U.S. PATENT DOCUMENTS

| | | | |
|---|---|---|---|
| 2,636,955 | 4/1953 | George | 200/50 A X |
| 2,795,739 | 6/1957 | Wood | 361/339 X |
| 2,856,450 | 10/1958 | Padgett et al. | 312/323 X |
| 3,062,606 | 11/1962 | Magrauth | 312/276 X |
| 3,967,164 | 6/1976 | Valle | 361/347 |

*Primary Examiner*—J. R. Scott
*Attorney, Agent, or Firm*—Kirkland & Ellis

[57] ABSTRACT

A mounting for an article, such as a high-voltage fuse. The article may be located inaccessibly behind a wall or accessibly in front of the wall. The wall may form a part of an enclosure and contains an opening. The article is affixed to one surface of a panel. The panel is attached to the wall so that it may be simultaneously moved and translated (or pivoted) end-for-end (or side-for-side) relative to the opening to selectively move the article between its two locations. The panel covers or blocks the opening in both locations of the article. The panel may be attached to the wall by rollers mounted at or near one end of the panel and by links pivotally connected between the wall and the panel. The rollers are guided to move generally along or coplanarly with the opening by channels on the wall adjacent to the opening. In this way, substantially all of the movement and translation of the panel may occur in front of the wall.

21 Claims, 29 Drawing Figures

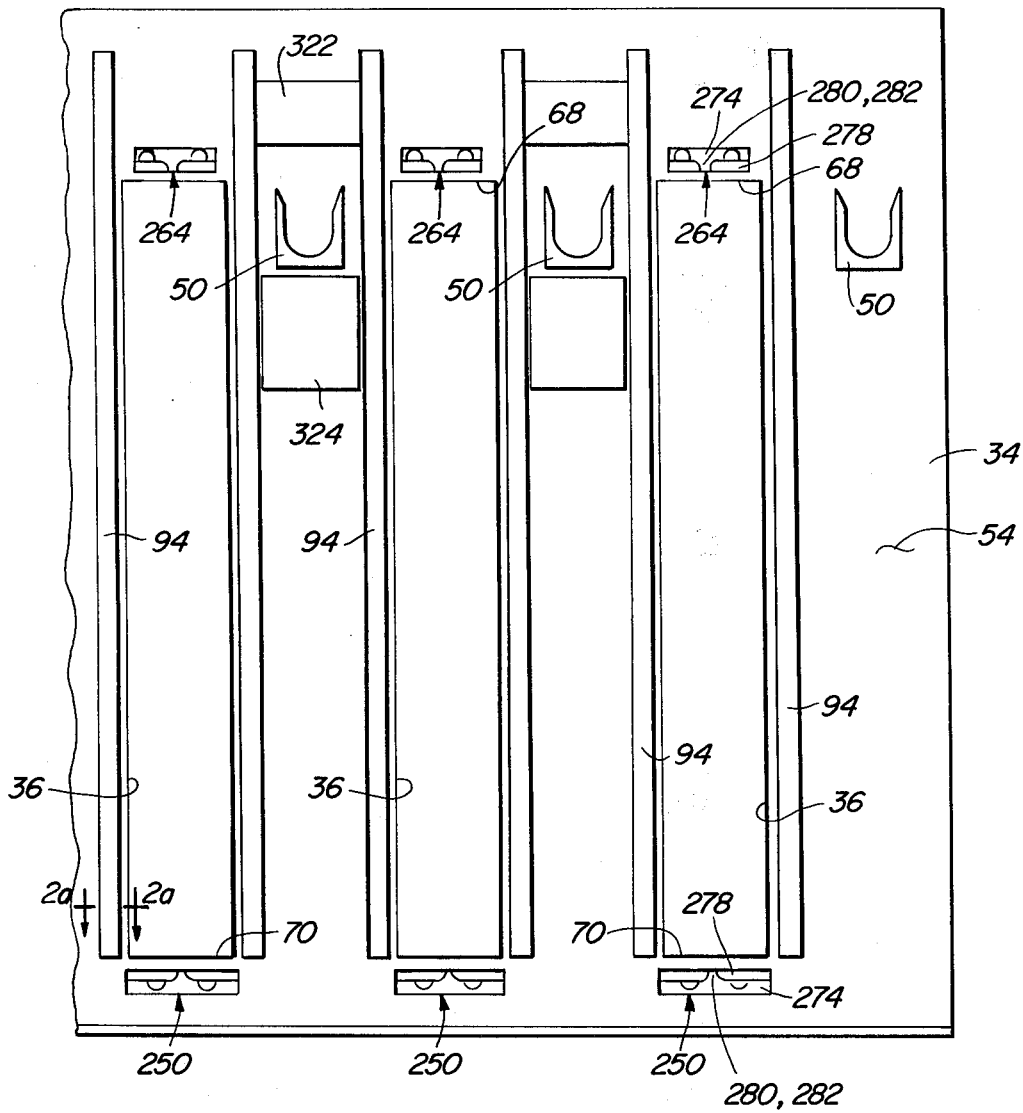
_Fig-2_
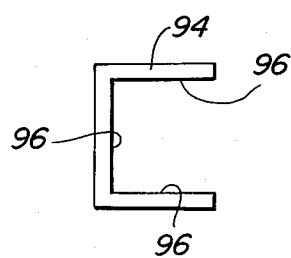
_Fig-2a_

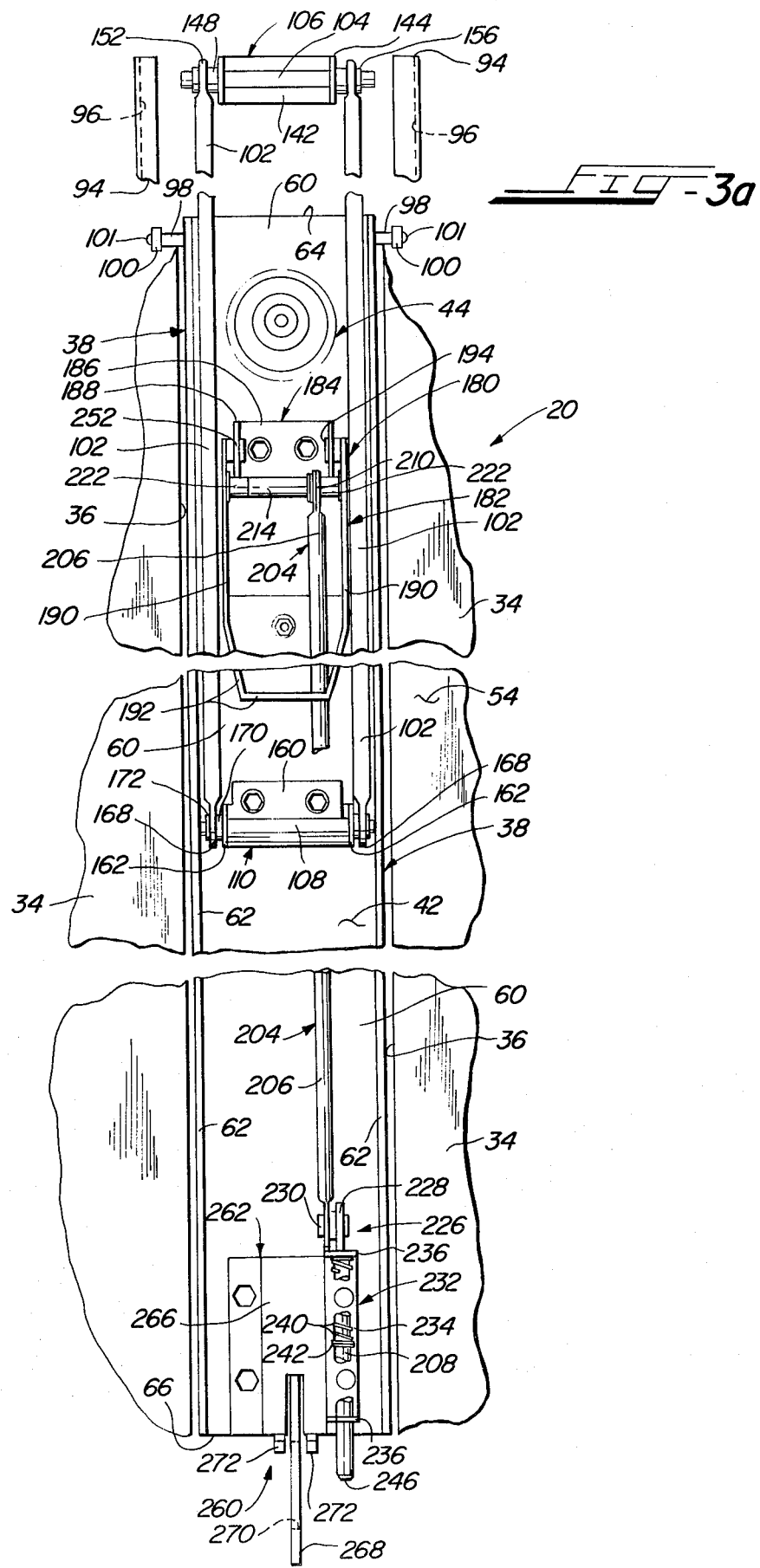

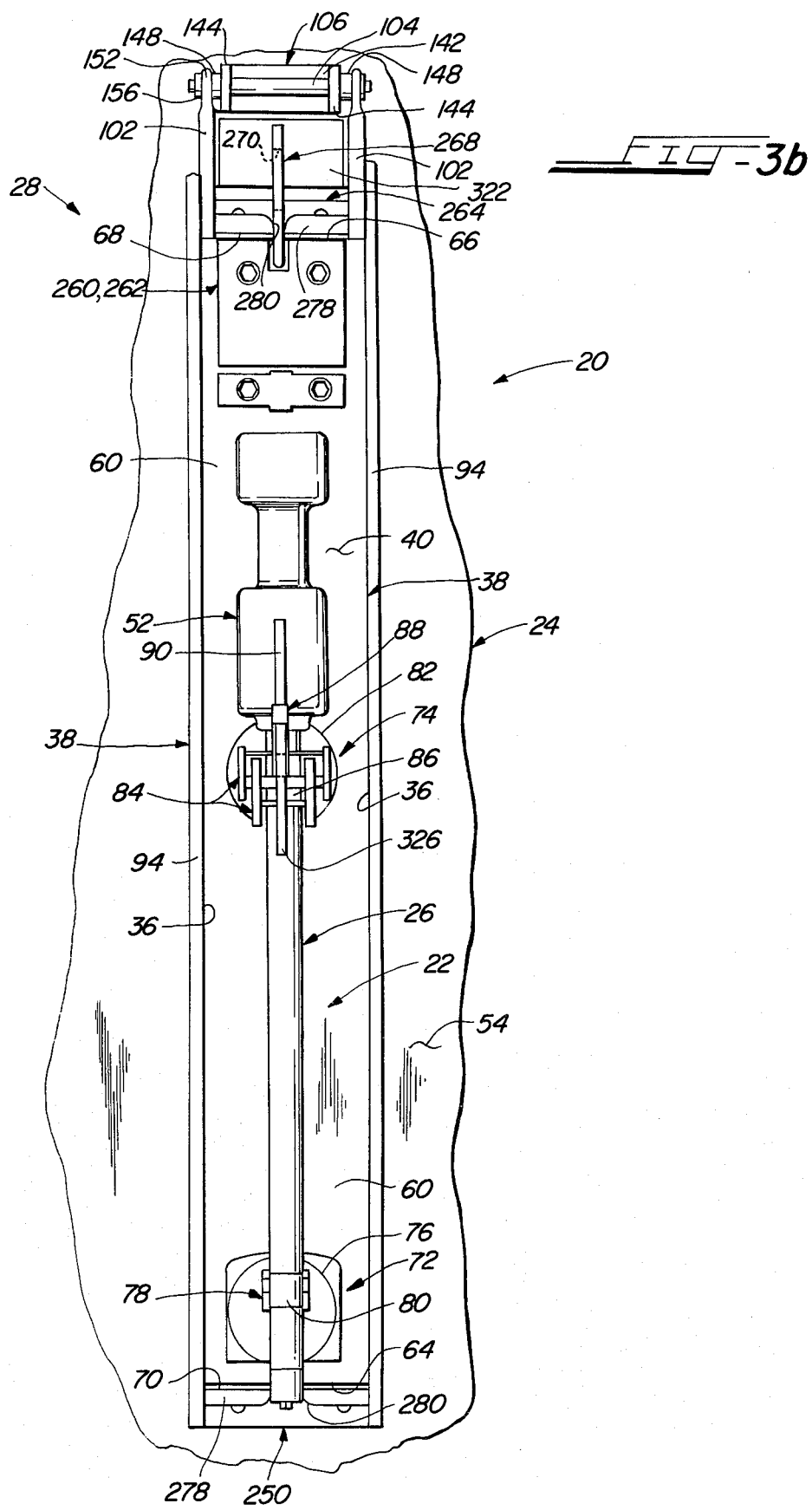

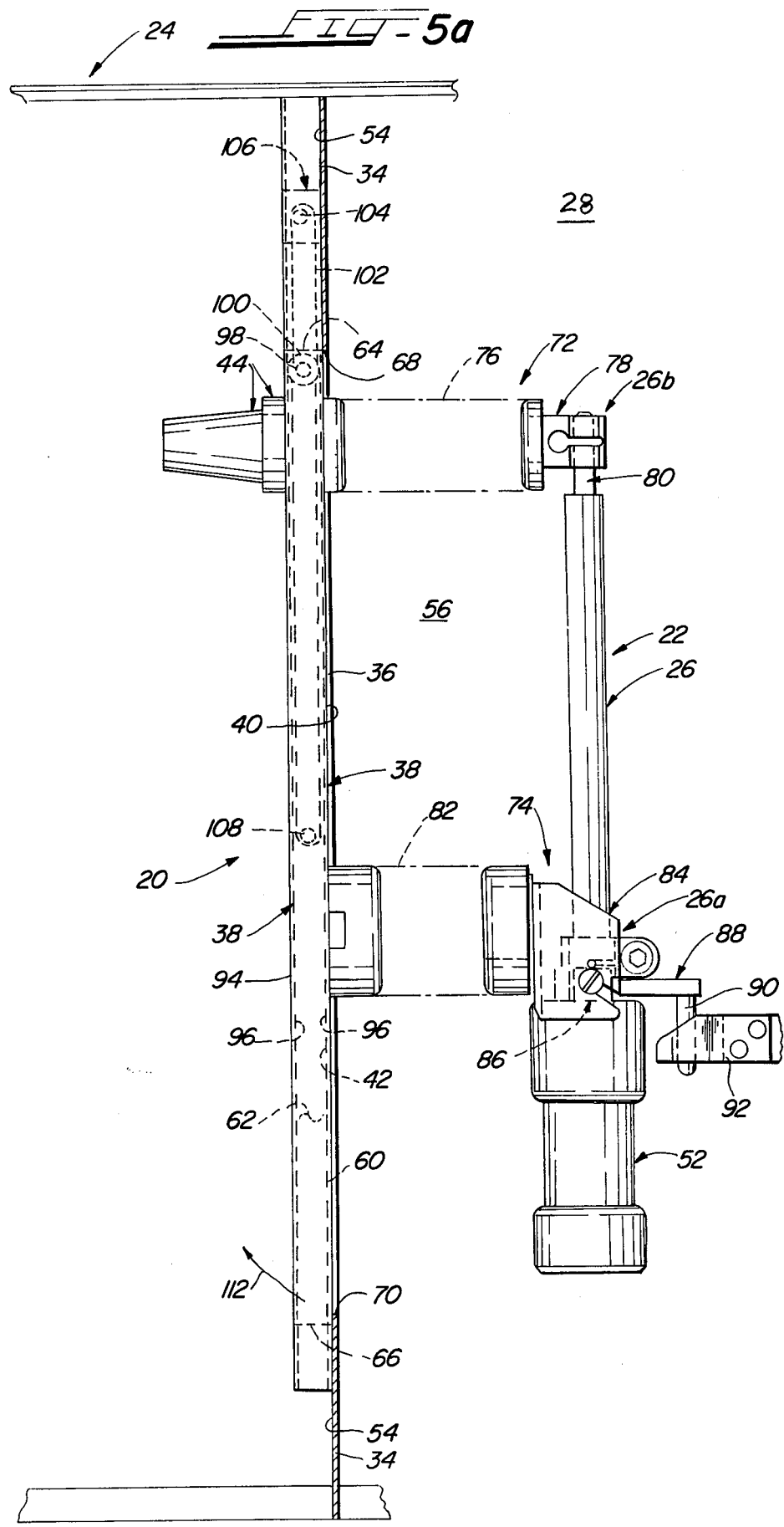

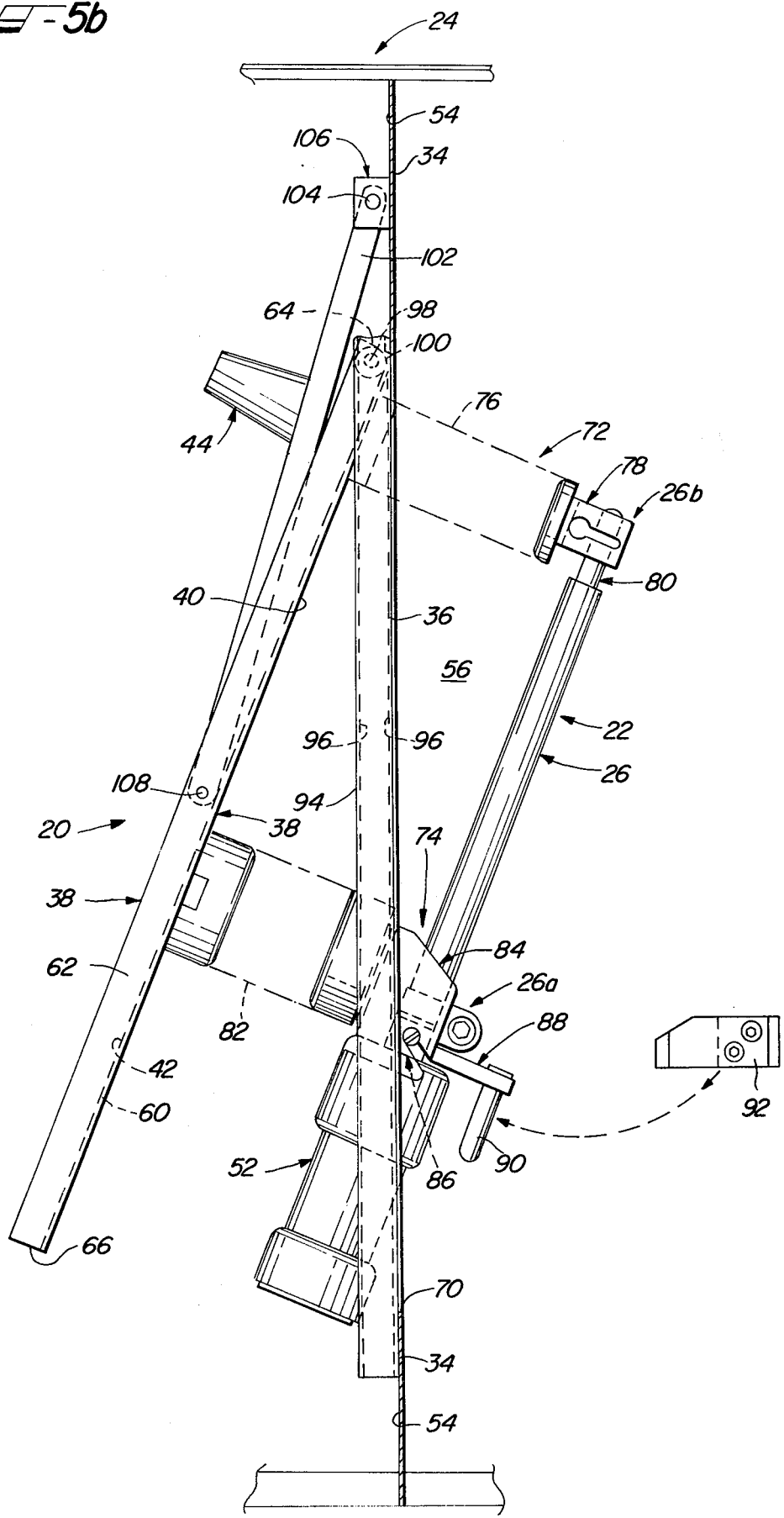

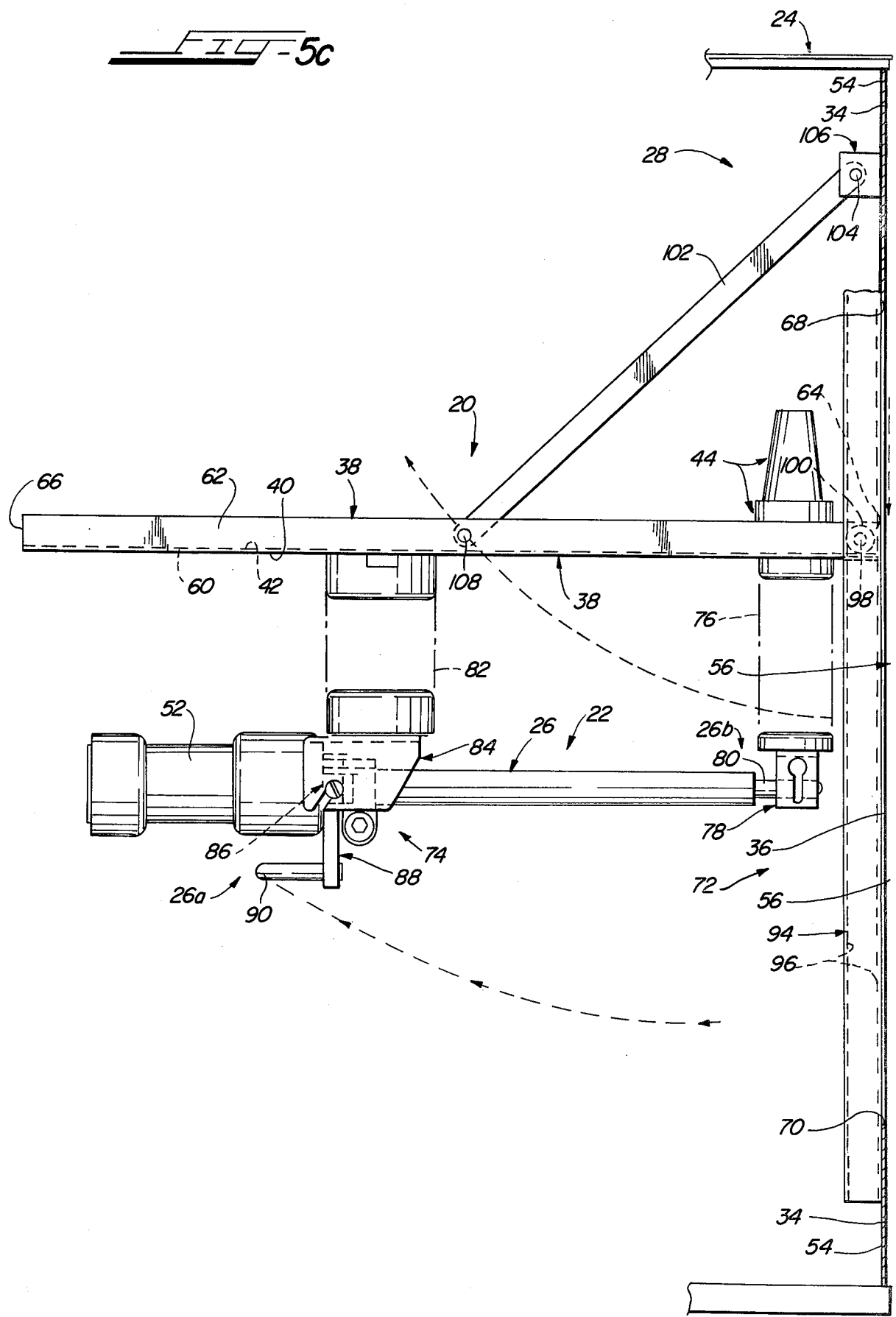

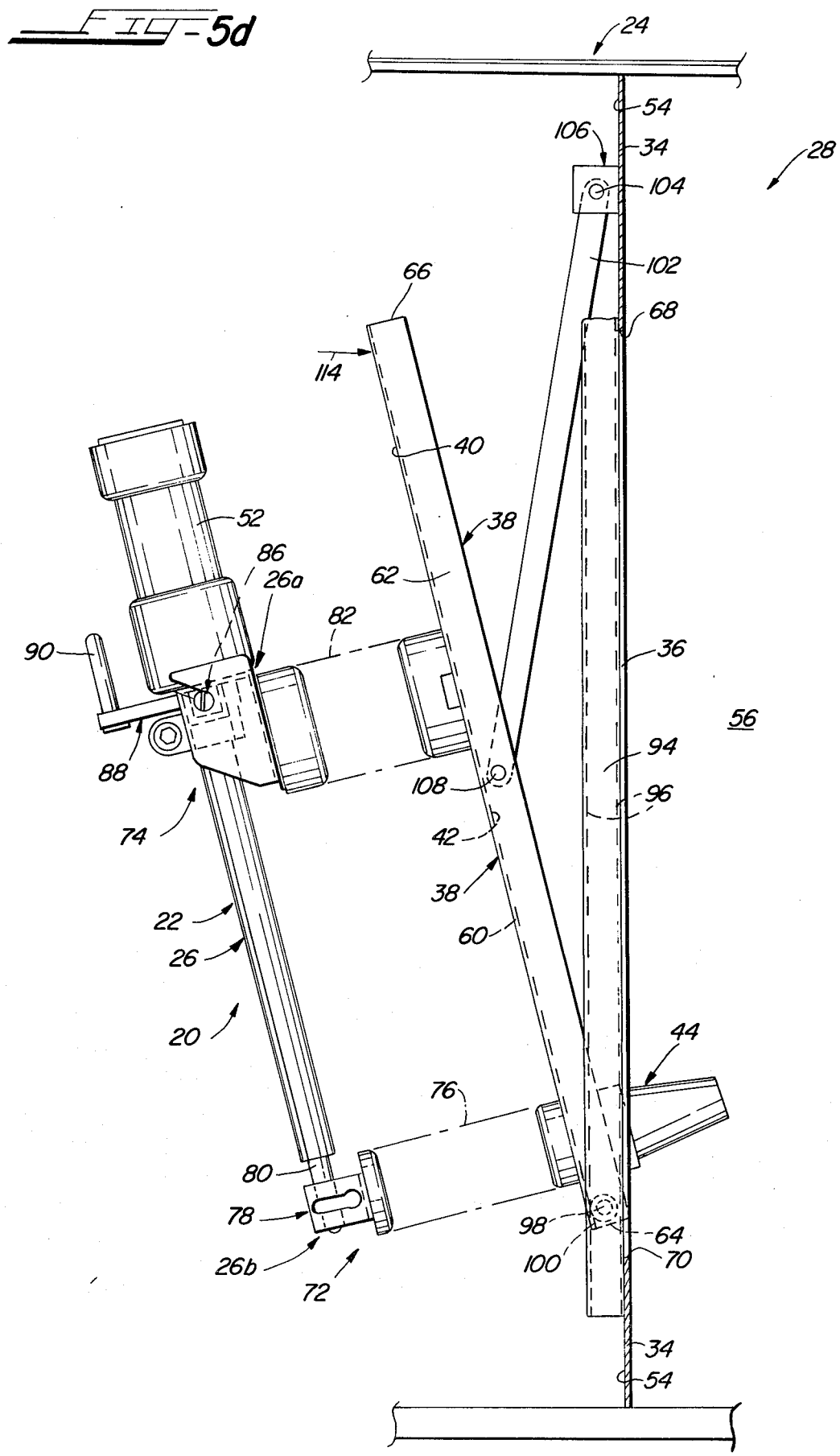

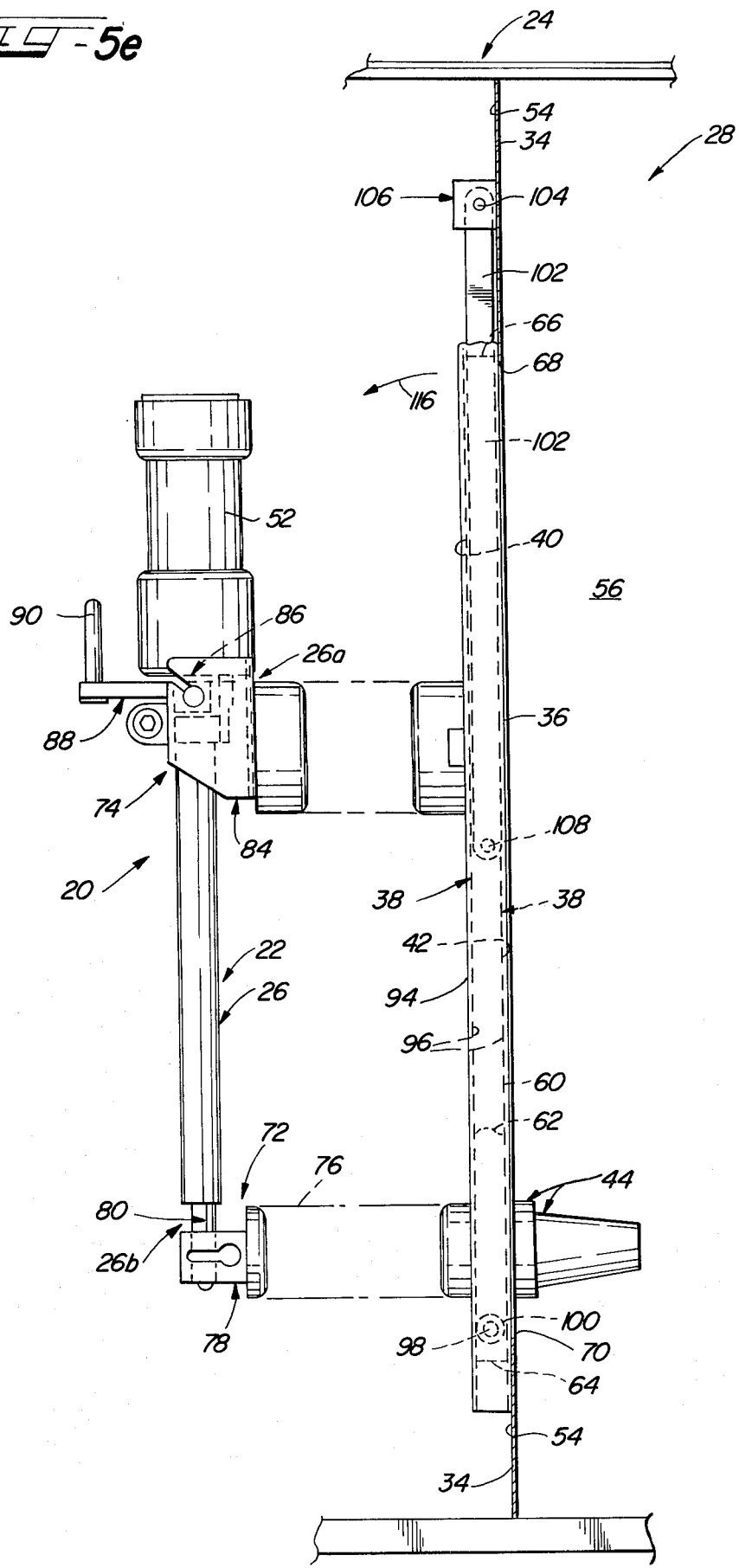

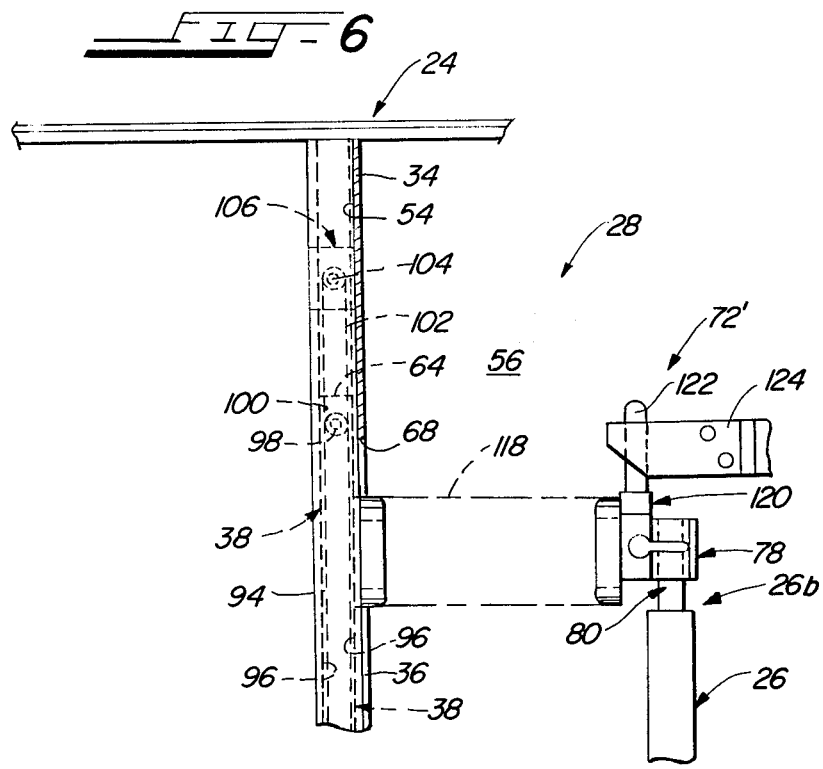
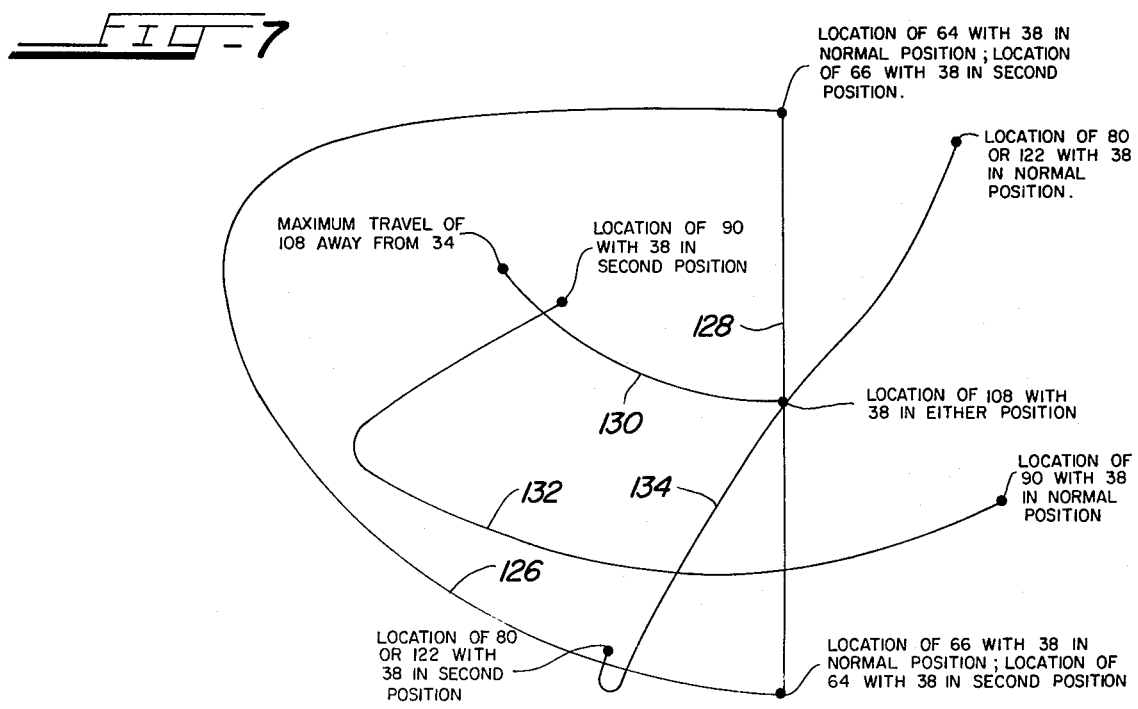

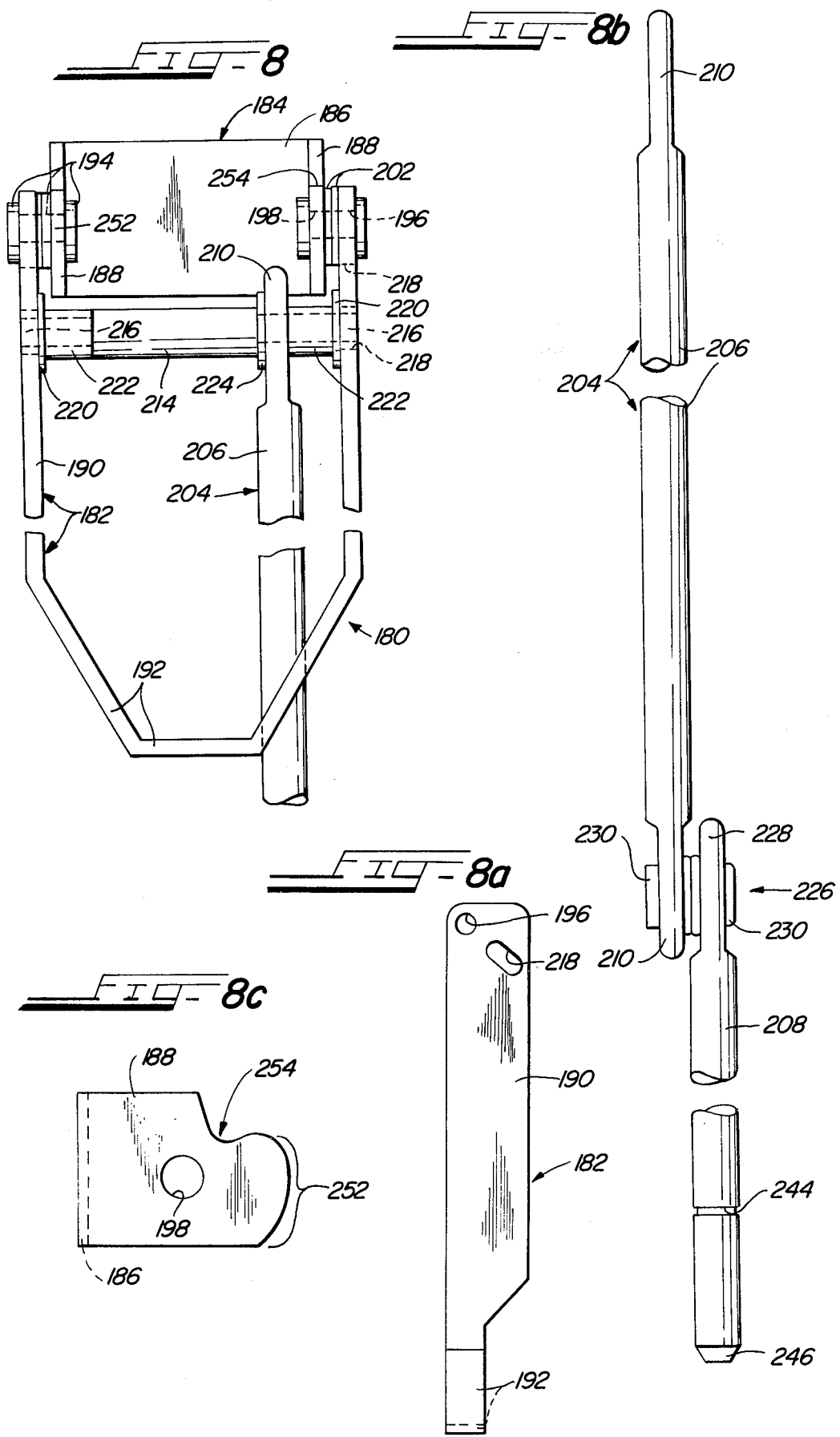

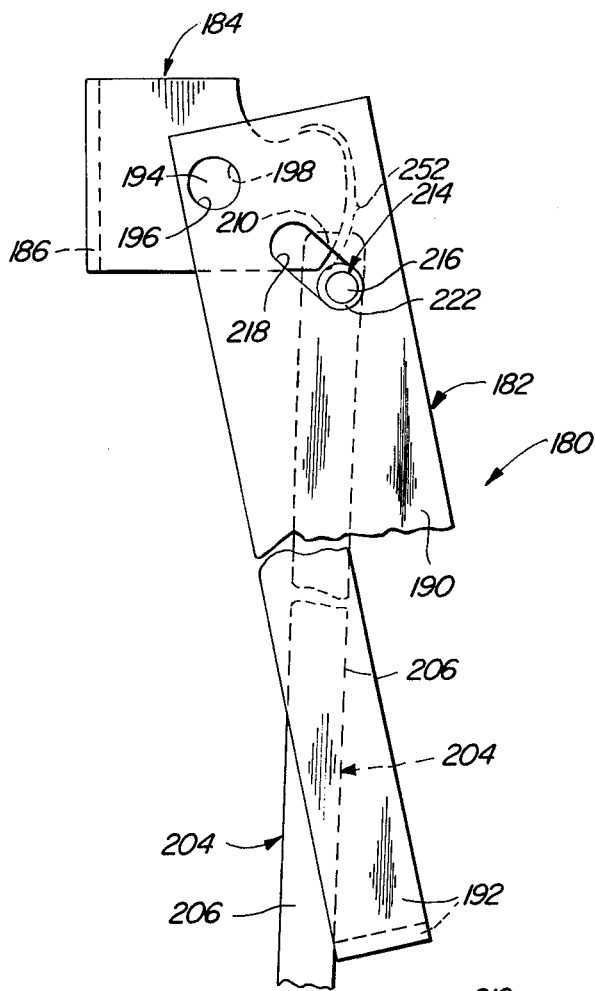
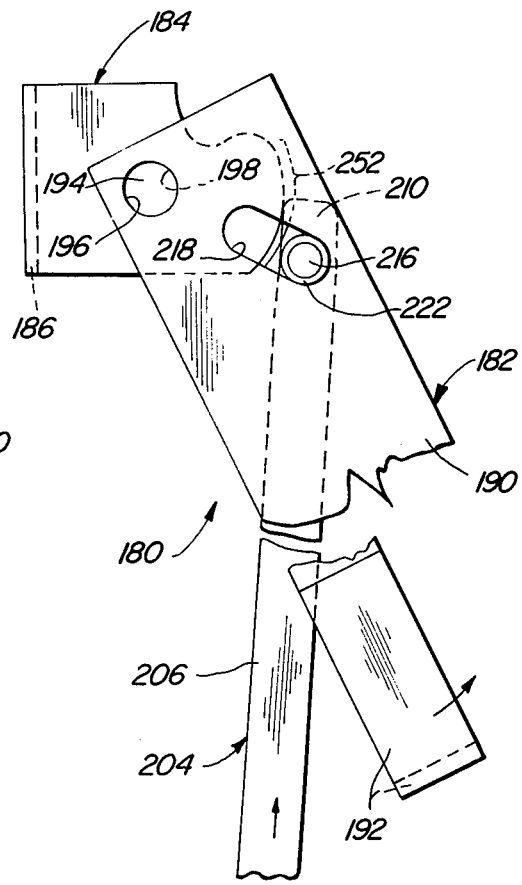
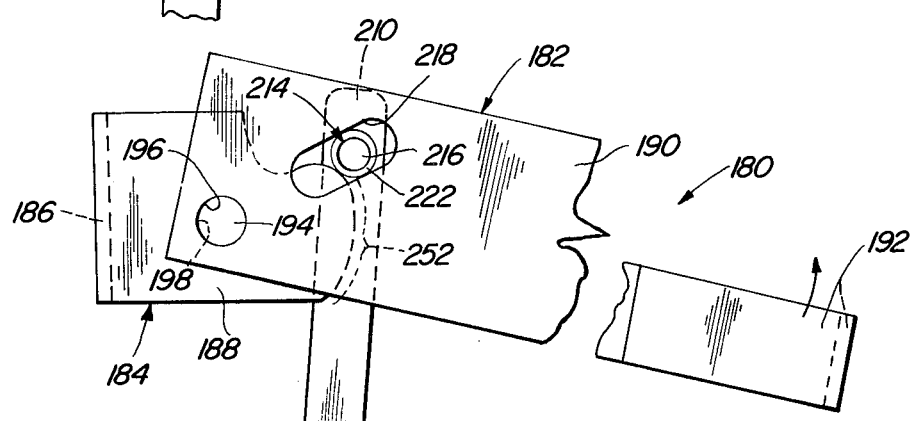
FIG-9a
FIG-9b
FIG-9c

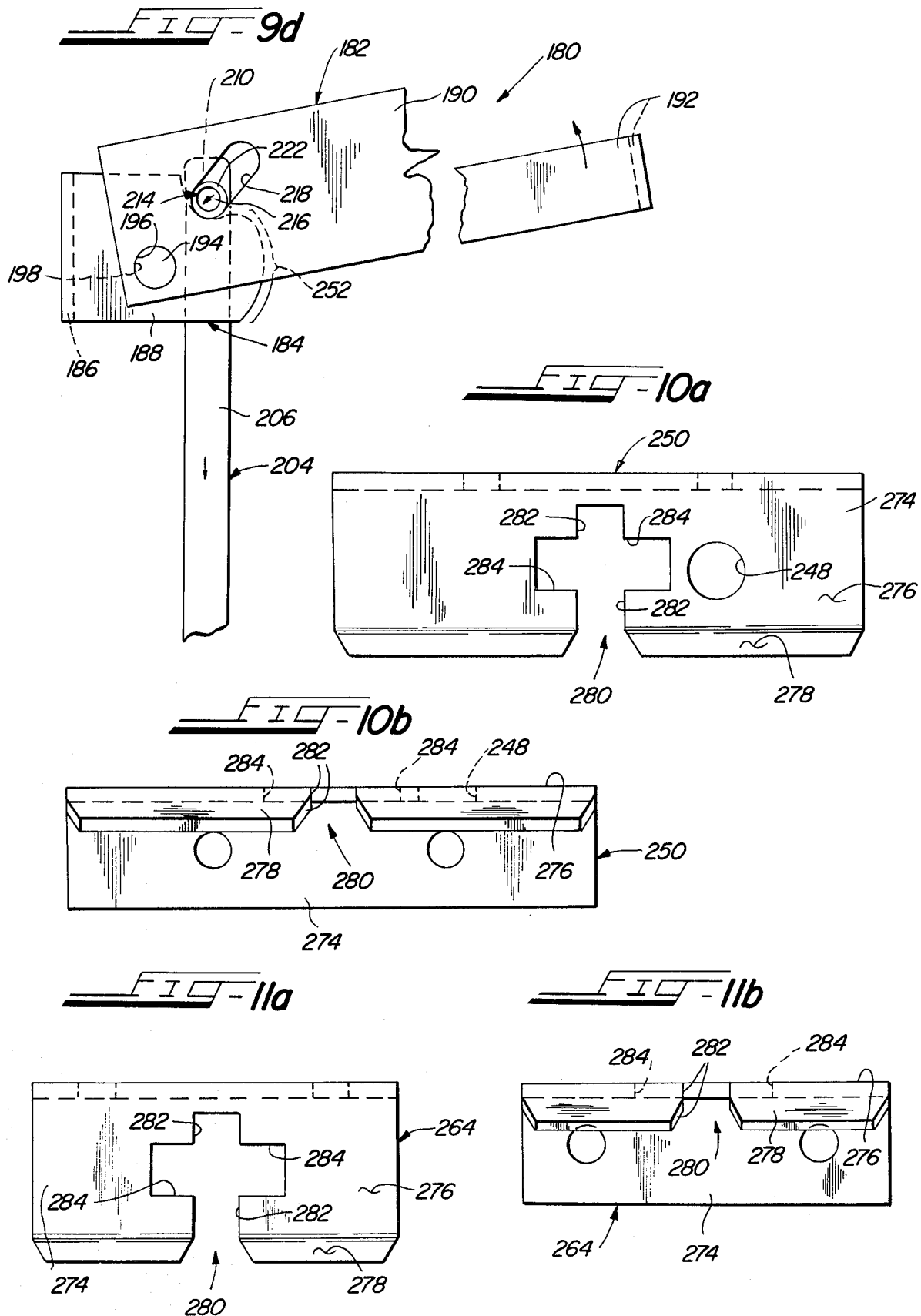

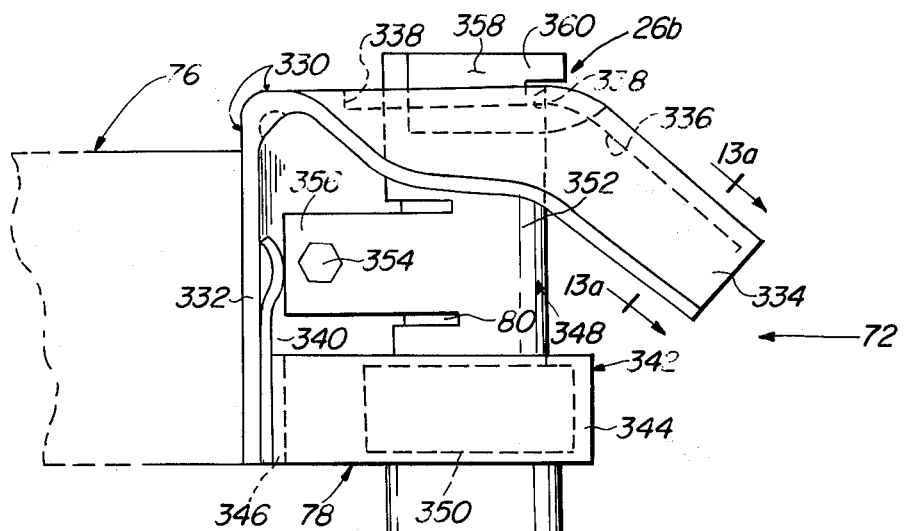
FIG-13
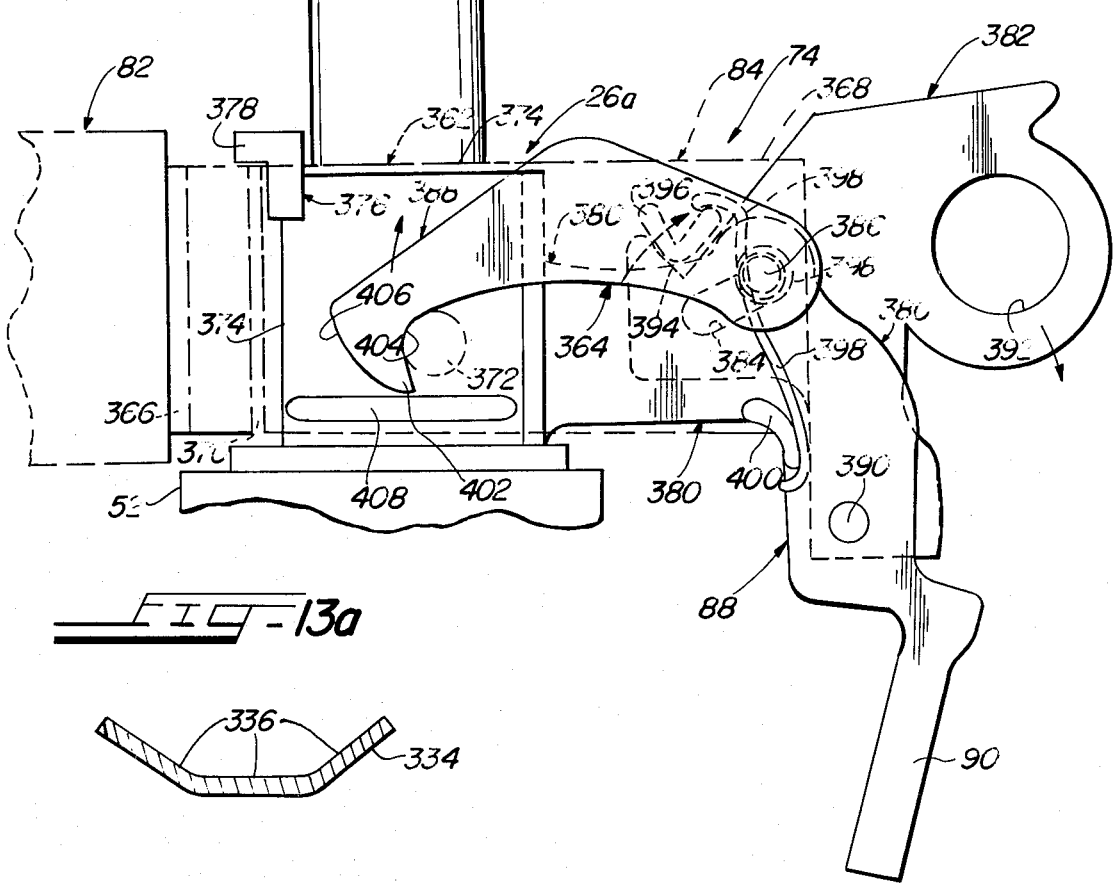
FIG-13a

MOUNTING FOR AN ARTICLE WHICH PERMITS MOVEMENT THEREOF BETWEEN INACCESSIBLE AND ACCESSIBLE POSITIONS

BACKGROUND OF THE INVENTION

1. Field of the Invention

The present invention relates to a mounting for one or more articles which are movable on the mounting between accessible and inaccessible positions. More specifically, the present invention relates to a mounting for an article which permits movement of the article from an inaccessible location in back of a wall or within an enclosure to an accessible location in front of the wall or outside of the enclosure. The present invention constitutes an improvement of, and a novel departure from, the mounting disclosed in U.S. Pat. No. 4,250,357, issued Feb. 10, 1981. Viewed even more specifically as an improvement of the mounting disclosed in the aforementioned United States patent, the present invention relates to a mounting for an electrical fuse or other electrical device which is movable on the mounting between an inaccessible position within an enclosure whereat the fuse is connected to an electrical circuit and an accessible position outside the enclosure, whereat the fuse is disconnected from the electrical circuit.

In many work environments, various articles or devices are used in normally inaccessible locations. Such inaccessible locations may typically be behind a wall which may form a portion of some type of enclosure. Often, depending upon the work environment, it may become necessary from time to time to inspect or replace the article or device for a variety of reasons. Either because of the size or weight of the article or device, or because of the nature of the environment behind the wall or within the enclosure, it may be desirable that movement of the article or device to an accessible location be achieved indirectly by manipulation and movement of a mounting for the article or device.

Considering high-voltage electrical apparatus of the so-called pad-mounted or metal-enclosed variety as exemplary of the work environment in which the mounting of the present invention may be used, the article or device may constitute an electrical device or component such as a fuse, a switch, a transformer, circuit breaker or a meter. In the past, typical pad-mounted and metal-enclosed gear has included a metal enclosure having one or more access doors on the exterior thereof. Opening of one or more of these doors, as well as of any doors, screens or barriers therebehind, renders accessible the electrical device or component. In a variation of typical pad-mounted or metal-enclosed gear, often referred to as "grounded front" or "dead front" gear, the opening of the exterior doors does not immediately render accessible the electrical device or component within the enclosure. What is rendered immediately accessible upon opening the exterior doors are various walls, panels, and other devices, such as electrical connectors or the like, the immediately exposed surfaces of which are all at the ground potential of the enclosure. Theoretically, then, a workman in the vicinity of this variety of high-voltage gear may safely contact either the enclosure or any of the items exposed by opening the exterior doors, because, presumably, none of these items are at an elevated potential. In so-called "grounded front" gear, then, access to the electrical devices or components within the enclosure requires further manipulation which typically involves or requires deenergization of the involved device or component so that the enclosure may be penetrated and the device or component may be removed by the workman.

Especially in the field of high-voltage electrical gear, safety is of prime importance. Accordingly, also of prime importance with such high-voltage gear is the prevention of the intentional or unintentional ingress into those portions of the enclosure which contain energized live parts when the electrical device or component of interest is being removed for inspection, replacement or the like. A primary object, therefore, of the present invention, is to provide a mounting for an electrical device or component, such as a high-voltage fuse, which may be moved between an inaccessible position within the enclosure and an accessible position outside of the enclosure, and which, in both positions of the device or component minimizes or absolutely eliminates any points of ingress into those portions of the enclosure whereat energized live parts could be intentionally or inadvertently contacted by a workman.

2. Brief Discussion of the Prior Art

U.S. Pat. No. 4,250,357 issued Feb. 10, 1981 discloses a fuse mounting. In that patent, a plurality of panels having front sides and back sides have fuses mounted to the back sides thereof. The panels normally cover openings through a wall of an enclosure and position the fuses in an inaccessible location within the enclosure. Each panel is hinged at its bottom to the enclosure wall. In order to gain access to each fuse, its panel is unlatched and is rotated outwardly and downwardly on its hinge until the fuse is accessibly located in a horizontal position immediately in front of the opening normally covered by the panel. When any panel is in this rotated position, its opening is uncovered. A portion of a body of a workman or a tool may inadvertently enter the enclosure through the uncovered opening during the time the fuse is being removed or inspected. If energized live parts are present within the enclosure and may be contacted through the uncovered opening, and if the electrical gear is intended to be so-called "grounded front" or "dead front" gear, the safety of the workman has been compromised to some extent by the presence of the uncovered openings. Accordingly, an object of the present invention is to provide a fuse mounting for electrical gear in which the fuse is movable between an inaccessible position within an enclosure and an accessible position outside of the enclosure, and wherein an opening in a wall of the enclosure is covered or blocked in both positions of the fuse.

The following United States patents also disclose a variety of panel-mounted electrical devices or components, wherein a panel is hinged or similarly connected to the wall of an enclosure to move the electrical device or component between an inaccessible location within the enclosure and an accessible location outside of the enclosure: U.S. Pat. Nos. 2,636,955 to George, issued Apr. 28, 1953; 2,565,314 to Lewis, issued Aug. 21, 1951; 2,268,943 to Johansson, issued Jan. 6, 1942; 2,128,648 to Johannson, issued Aug. 30, 1938; 2,020,913 to Schramm, issued Nov. 12, 1935; 1,826,370 to Schwarz, et al, issued Oct. 6, 1931; 1,561,239 to Jennings, issued Nov. 10, 1925; 1,594,010 to Gaspari, issued July 27, 1926; and 1,351,043 to Kries, issued Aug. 31, 1920. Some of these patents are similar to the '357 patent in that a hinged panel is rotated to move an electrical component mounted thereon between inaccessible and accessible locations, and when the component is in its accessible position, an opening into the interior of a housing or behind a wall is left opened and uncovered. Such patents include those to George, Johannson, Schramm, Schwarz and Gaspari. In others of these patents, a blocking member is connected to the panel so that movement of the panel moves an electrical component or device out of the enclosure or in front of a wall thereof, but the blocking member moves simultaneously to cover the opening. These patents include those to Lewis, Jennings, and Kries.

As discussed below, none of the above-noted prior art patents, including the '357 patent, are structurally and functionally similar to the mounting of the present invention, and merely provide a general overview of various techniques for moving electrical devices or components between inaccessible and accessible locations.

SUMMARY OF THE INVENTION

In its broadest aspect, the present invention comprises a mounting for an article which may be inaccessibly located in back of a wall which has an opening therethrough. The mounting comprises a panel having opposed ends. Facilities affix the article to a surface of the panel. The panel is attached to the wall so that it may be simultaneously moved and translated (or pivoted) end-for-end (or side-for-side) relative to the opening between a first position and a second position. In the first position, the article and the surface of the panel to which it is mounted are inaccessibly located in back of the wall and the panel substantially covers the opening. In the second position, the article and the surface of the panel are accessibly located in front of the wall, and the panel again substantially covers the opening. The simultaneous movement and end-for-end translation (or pivoting) of the panels preferably occurs substantially in front of the wall. Also, preferably, a portion or one end of the panel is constrained to follow a path which is generally co-planar with or along the opening while the other end of the panel is constrained to follow a curvilinear path wholly in front of the wall. In specific preferred embodiments, the article is an electrical device and the wall is a portion of a walled enclosure, the front of the wall being outside the enclosure, and the back of the wall being within the enclosure. Further, where the article is an electrical device, it is preferably affixed to the surface of the panel in insulated, spaced relationship therefrom.

In order to achieve the above-described simultaneous movement and end-for-end translation (or pivoting), a first constraining facility may be utilized. The first constraining facility may include a member, such as a stud or a roller, mounted to the panel near or at the one end thereof and a track or the like extending generally along the opening for guiding the member so that the portion or the one end of the panel follows the path which is generally co-planar with or along the opening. A second constraining facility may also be provided. The second constraining facility may include both the roller and the track, as well as a link, one end of which is pivotally connected to the panel, and the other end of which is pivotally connected to the wall. Preferably, the link is pivotally connected to the panel at a point between the ends thereof and is at least as long as the distance between its pivotal connection to the panel and the member. In further specific preferred embodiments, the member is located at the one end of the panel, and the opening are symmetrical, and the link is pivotally connected to the panel at an axis of symmetry thereof, which is generally midway between the ends of the panel. Further, the link is, in this specific preferred embodiment, at least as long as the distance between the panel's axis of symmetry and the member.

In yet further specific preferred embodiments where the article is an electrical device or component, such as an electrical fuse, there may also be included a first electrical contact associated with the fuse and electrically continuous therewith. A first stationary electrical contact within the enclosure is engaged by the first electrical contact when the panel is in its first position and is disengaged by the first electrical contact when the panel is not in its first position. According to this specific preferred embodiment, there may also be included a second electrical contact associated with and electrically continuous with the fuse so that the fuse is in electrical series between the first and second electrical contacts. On the one hand, there may also be included a second stationary electrical contact within the enclosure which is engaged by the second electrical contact when the panel is in its first position and which is disengaged by the second electrical contact when the panel is not in its first position. On the other hand, there may be provided an electrical connector facility which is selectively engageable with and disengageable from the second electrical contact from outside the enclosure when the panel is in its first position. This electrical connector may comprise a load-break or other elbow, in which event the second electrical contact may comprise a bushing well or similar device.

In additional specific preferred embodiments, where the electrical connector is employed, a manipulable interlock latch may be included. The latch is responsive to the engagement by the electrical connector of the second electrical contact for preventing movement of the panel out of its first position. The interlock latch is also responsive to manipulation thereof following the disengagement of the electrical connector from the second electrical contact for permitting movement of the panel out of its first position.

The panel may also include a main latch which holds the panel in either of its positions. The main latch is manipulable independently from the interlock latch to release the panel for simultaneous movement and end-for-end translation (or pivoting) from its first to its second position, or from its second to its first position. The panel is simultaneously movable and translatable (or pivotable) end-for-end from its first to its second position only if both the interlock latch and the main latch have been appropriately manipulated to release the panel. The panel is simultaneously movable and translatable (or pivotable) end-for-end from its second to its first position only if the main latch has been appropriately manipulated to release the panel. Preferably, the main latch includes a member which is engageable by a "shotgun stick" or a "hot stick" in both positions of the panel to permit both manipulation of the main latch and the movement and simultaneous translation (or pivoting) of the panel from a remote location with either type of stick engaging the member. Further, where a "shotgun stick" is used and the electrical connector is present, the electrical connector is also manipulable with the "shotgun stick" when the panel is in its first position. The interlock latch means is also preferably manipulable with either a "shotgun stick" or a "hot stick".

BRIEF DESCRIPTION OF THE DRAWING

FIG. 2 is a front elevation of a wall forming a portion of the enclosure of FIG. 1;

FIG. 2a is a cross-sectional view taken along line 2a-2a in FIG. 2 and showing in detail a channel member attached to the wall of FIG. 2;

FIG. 3a is a front elevation of a panel forming a portion of the mounting of the present invention in greater detail than is shown in FIGS. 1 or 1a; the panel is shown in an arbitrarily selected normal position;

FIG. 3b is a front elevation of the panel depicted in FIG. 3a after the panel has been moved and simultaneously translated (or pivoted) end-for-end to an arbitrarily selected second position;

FIG. 4 is an enlarged front elevation of a pair of links, a pivot therefor, and a roller-and-track combination forming a portion of the mounting of the present invention and depicted in greater detail than in FIGS. 1, 1a, and 3a;

FIGS. 5a–5e are generalized side elevations of the panel depicted in FIGS. 1, 1a, 3a and 3b as the panel moves from the normal position of FIG. 3a to the second position of FIG. 3b;

FIG. 6 is a side elevation of certain apparatus which may be present within the enclosure of FIG. 1 and depicts an alternative embodiment to certain portions of the apparatus depicted in FIGS. 1, 1a, 3a, 3b and 5a–5e;

FIG. 7 is a representation of the paths taken by various portions of the panel of the mounting of the present invention as the panel is simultaneously moved and translated (or pivoted) end-for-end;

FIG. 8 is an enlarged front elevation of an interlock latch assembly usable with the mounting of the present invention, and FIGS. 8a, 8b and 8c depict, respectively, a side elevation of a handle, a front elevation of an articulated rod, and a side elevation of a handle bracket forming a portion of the interlock latch assembly of FIG. 8;

FIGS. 9a–9d are side elevations of a portion of the interlock latch assembly of FIG. 8 depicting the positions of the various parts thereof during manipulation and movement thereof;

FIGS. 10a and 10b are, respectively, a top view and a front elevation of a bottom latch plate with which the interlock latch assembly of FIGS. 8–8c and the main latch assembly of FIGS. 12a and 12b cooperate to hold the panel in its first or normal position;

FIGS. 11a and 11b are, respectively, a top view and a front elevation of a top latch plate with which the main latch of FIGS. 12a and 12b cooperates to hold the panel in its second position;

FIG. 13 is a side elevation of one type of facility which may be used to affix an electrical fuse to the panel of FIGS. 1, 1a, 3a and 3b, which affixing facility is shown in greater detail than in FIGS. 3b and 5a–5e; and FIG. 13a is a sectional view taken along line 13a—13a in FIG. 13.

DETAILED DESCRIPTION

Introduction

Figure 1:
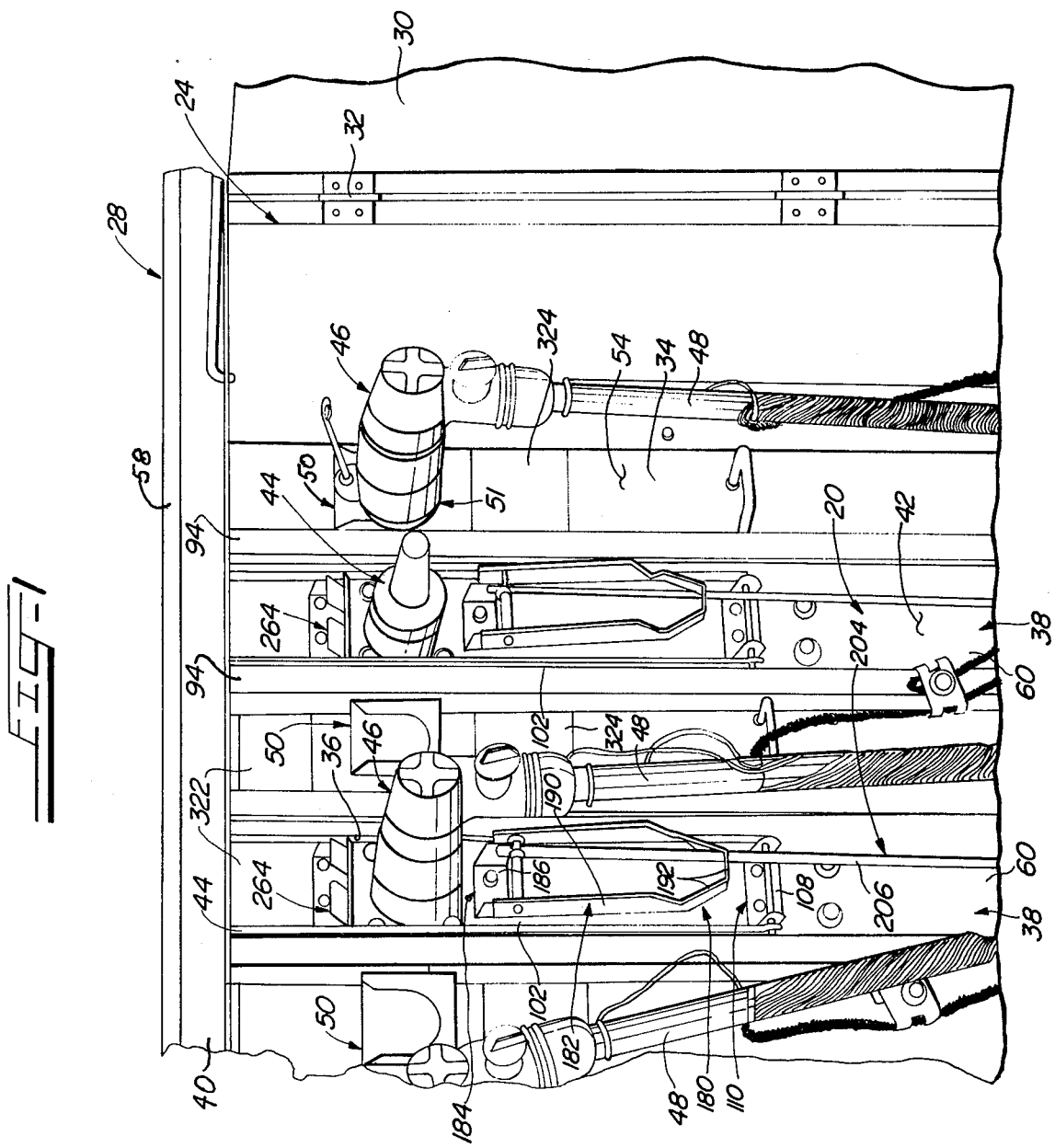
FIG. 1 is a front elevation, viewed from an oblique angle, of a portion of an enclosure which houses electrical equipment and which utilizes a mounting for certain of the equipment according to the principles of the present invention.

Referring first to FIGS. 1, 3 and 5, the present invention in its broadest aspect relates to a mounting 20 for an article or device 22 which may be located in one of two positions, specifically, inaccessibly behind a wall or other structure or accessibly in front of the wall. Typically, the wall forms a part of an enclosure, and the article 22 may be inaccessibly located within the enclosure 24 (FIGS. 1, 3a and 5a) or accessibly located outside the enclosure 24 (FIGS. 3b and 5d). The article or device 22 may have any desired size, shape and configuration, as may the enclosure 24. Moreover, several articles or devices 22 may be present, some of which are accessible at the same time the others are inaccessible, and vice versa.

In specific embodiments of the present invention, the article or device 22 is a high-voltage fuse 26 or other electrical device (for example, a switch, transformer, circuit breaker, or meter), and the walled enclosure 24 is a metal enclosure or cabinet which may house a number of fuses 26 as well as other associated electrical components or equipment (not shown), such as switches, meters, surge arrestors, transformers, cables, cable terminations and bus work. Thus, in the specific embodiments of the present invention, the numeral 20 refers to a fuse mounting.

A number of high-voltage fuses 26, each on a respective mounting 20, along with the other electrical components or equipment (not shown) within the enclosure 24, may be collectively referred to as pad-mounted or metal-enclosed electrical gear or high-voltage gear 28. The gear 28, with which the present invention is utilized, is sometimes referred to as "grounded front" gear. The phrase "grounded front" refers to the fact that when doors 30 mounted to the enclosure 24 by hinges 32 are opened, as depicted in FIG. 1 (in which only one such door 30 is shown), there is presented a wall 34 of the enclosure 24, behind which are normally located the electrical components, including the fuses 26, which make up the gear 28. Additional doors 30 and additional walls 34, not shown in FIG. 1, may be included. For example, a second door and wall may be located to the left of the door 30 and the wall 34 shown in FIG. 1, and two more doors and walls may be located on the opposite side of the enclosure 24. When any door, such as the door 30, is opened, any wall, such as the wall 34, and any apparatus on or adjacent the outside surface thereat, which is rendered accessible thereby is at electrical ground potential, as is the remainder of the outside of the enclosure 24. Theoretically speaking, because the enclosure 24, its walls 34 and apparatus on the outside surface thereof are at ground potential, these items may be safely contacted by workmen, regardless of the electrical condition (e.g., energized) of the fuses 26 and the other components or equipment within the enclosure 24. Thus, when the gear 28 is of the so-called "grounded front" variety, merely opening the doors 30 does not render immediately accessible to workmen energized live parts, contact with which is undesirable.

Figure 4:
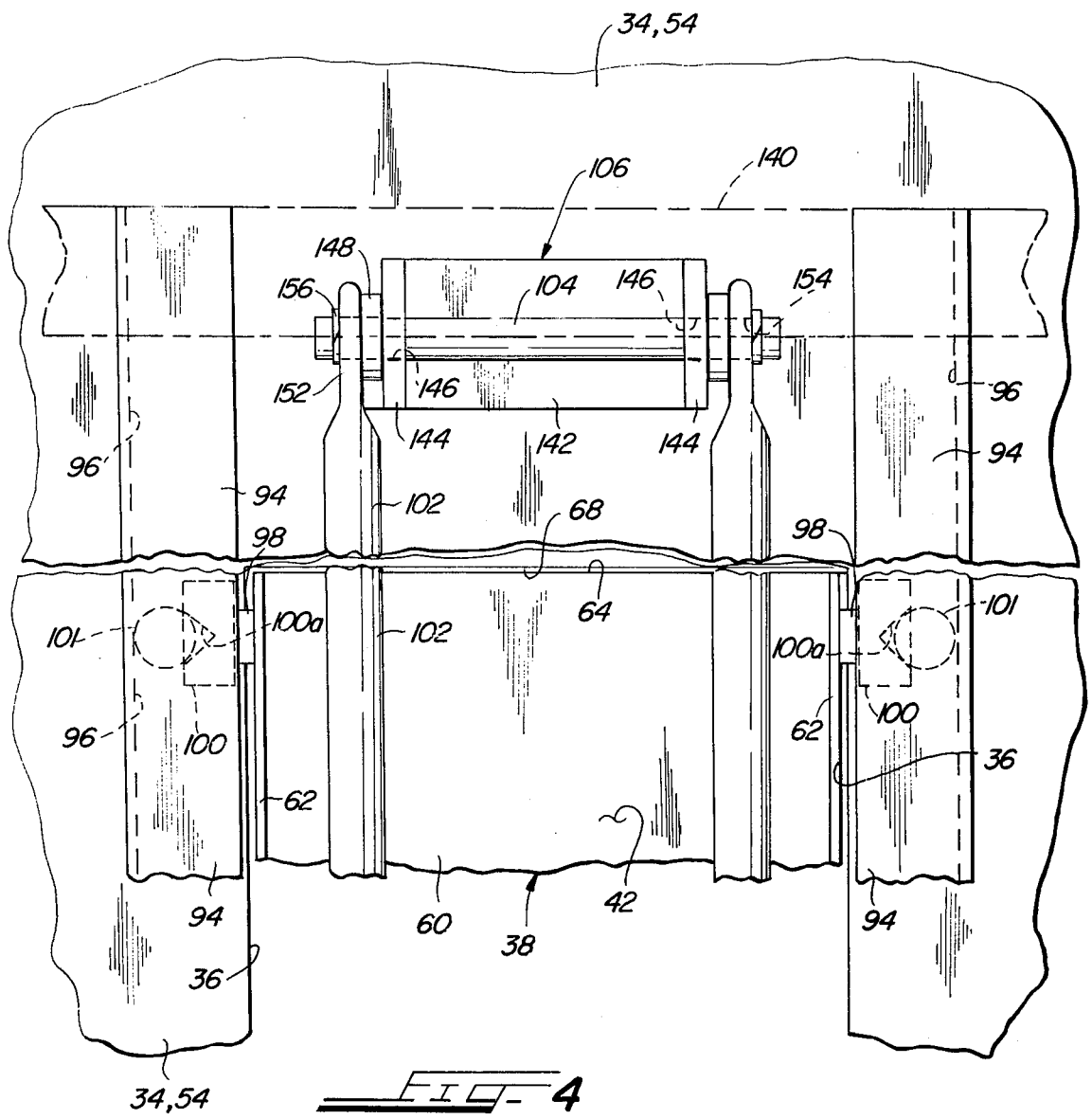

When the mounting 20 of the present invention occupies a first or normal position, which is generally depicted in FIG. 1 and is shown in more detail in FIGS. 3a, 4 and 5a, its fuse 26, or other article or device 22, is inaccessibly located within the enclosure 24 behind the wall 34, and an opening 36 through the wall 34 is normally covered or blocked by a panel 38, which forms a portion of the fuse mounting 20. A number of openings 36 and mountings 20 may be present. As shown in FIGS. 3b and 5a–5c, each fuse 26 is affixed to a first surface 40 of its panel 38 and is located within the enclosure 24 behind the wall 34 when the mounting 20 and its panel 38 are in their first or normal position. In the first or normal position of the panel 38, a second surface 42 of the panel 38 is located outside the enclosure 24 (in front of or coplanar with the wall 34) and is the surface of the panel 38 visible in FIGS. 1, 3a and 4.

As generally depicted in FIGS. 3b and 5e, the panel 38 of each mounting 20 is attached to the wall 34 so that it may be manipulated to occupy a second position, in a manner described below, to locate its first surface 40 outside the enclosure 24 (in front of or coplanar with the wall 34) and its second surface 42 facing inside the enclosure 24. Such manipulation of the panels 38 also accessibly locates their fuses 26 outside the enclosure 24 with the panels 38 again covering or blocking their openings 36. Each panel 38 covers or blocks its opening 36 in both positions thereof—when its fuse 26 is inaccessibly located within the enclosure 24 and when its fuse 26 is accessibly located outside the enclosure 24—so that no significant point of ingress into the enclosure 24 past the wall 34 is available. It is highly desirable that no such point of ingress be available so that, while workmen are in the vicinity of the gear 28, there is no possibility that a portion of a workman's body or a tool may inadvertently enter the enclosure 24 and contact energized live parts.

As generally described above, the mounting 20 of the present invention presents a distinct advantage over the fuse mounting described in U.S. Pat. No. 4,250,357, issued Feb. 10, 1981. In that patent, a plurality of panels, having front sides and back sides, and having fuses mounted to the back sides thereof, normally position the fuses in an inaccessible location within a walled enclosure. Each panel is hinged at its bottom to the enclosure wall. In order to gain access to the fuses, the panels are unlatched and rotated outwardly and downwardly on their hinges until their fuses are accessibly located in a horizontal position immediately in front of openings normally covered by the panels. When the panels are in their rotated position to render the fuses accessible, the openings are uncovered. Thus, a portion of the body of a workman or a tool may inadvertently enter the enclosure through the uncovered opening. Again, as can be seen from the above general description of the present invention, the openings 36 in the wall 34 of the enclosure 24 are covered or blocked, whether the fuse 26 is inaccessible within the enclosure 24 or is accessible outside the enclosure 24.

When any panel 38 is in its first or normal position (FIGS. 1, 3a, 4 and 5a), one end 26a of its fuse 26 may be electrically connected, as described below, to a first point of an electrical circuit (not shown). The other end 26b of the fuse 26 may be electrically connected to a terminal 44 (FIGS. 1 3a and 5a) which is mounted on and insulatively passes through the panel 38. The terminal 44 may take the form of a load-break integral bushing or a load-break bushing insert associated with a bushing well. An electrical connector 46 (FIG. 1), such as a load-break elbow, is selectively engageable with and disengageable from the terminal 44 to electrically connect or disconnect an electrical conductor or cable 48, which mounts the connector 46, to the other end 26b of the fuse 26. The electrical conductor 48 may be connected to a second point of the electrical circuit (not shown). Non-load-break bushings, bushing-insert-bushing-well combinations, and elbows may also be used.

The first point of the electrical circuit (not shown), to which the fuse end 26a is connected when the panel 38 is in its first or normal position, may be, in turn, connected through appropriate bus work (not shown) within the enclosure 24 to other electrical components, such as the movable contact of a high-voltage switch (not shown) located within the enclosure 24. The stationary contact of the switch may be electrically connectable to another point of the electrical circuit using, for example, terminals, electrical connectors, and electrical conductors (not shown) similar to the terminals 44, electrical connectors 46, and electrical conductors 48 depicted in FIG. 1. Typically, a source of electrical power is connected to the stationary contact of the switch. The electrical conductors 48 mounting the electrical connectors 46 are typically connected to an electrical load. When the switch associated with a particular fuse 26 is closed and the panel 38 mounting the fuse 26 is in its first or normal position, a continuous electrical circuit is formed between the source and the load if the associated electrical connector 46 engages its terminal 44.

Assuming that the switch (not shown) which is in series with the fuse 26 is connected to the source of electrical power by apparatus which is similar to the terminals 44 and the electrical connectors 46 depicted in FIG. 1, and further assuming that the electrical connectors 46 are load-break elbows and the switch is a load-break switch, the continuous electrical circuit between the source and the load may be rendered discontinuous while the circuit is energized in one of four ways. First, the electrical connector (not shown) associated with the switch (not shown) may be disengaged from its terminal (not shown). Second, the switch (not shown) may be opened. Third, the fuse 26 may operate. Fourth, the electrical connector 46 may be disengaged from its terminal 44.

The third mode of rendering the circuit discontinuous—operation of the fuse 26—is one of the reasons for using the mounting 20 of the present invention. Specifically, if one or more of the fuses 26 forming a portion of the gear 28 operate, such must be replaced after the cause of fuse operation is remedied. The use of the mounting 20 of the present invention, therefore, permits access to the operated fuse 26 for replacement thereof while no significant point of ingress to the interior of the enclosure 24 is available.

Where the electrical connectors 46 are elbows or load-break elbows and the terminals 44 are either integral bushings or bushing-insert-bushing-well combinations, the wall 34 of the enclosure 24, which is exposed when the door 30 is open, may contain parking stands 50 adjacent each mounting 20. As is well known, attachable to each parking stand 50, and shown only partially in FIG. 1, is a device 51 such as an insulated parking bushing or a feed-through parking bushing with which the load-break elbow 46 may be associated when it is disengaged from its respective terminal 44. The reasons for and the uses of the devices 51 are well known and are more fully explained in the above-referenced U.S. Pat. No. 4,250,357, as well as in various literature such as that published by RTE Corporation of Waukesha, Wis. and the Elastimold Division of Amerace Ensa Corporation in Esna Park, Hackettstown, N.J., manufacturers of various types of elbows, bushings and devices usable with the parking stands 50.

For reasons to be explained below, in viewing FIG. 1, it is important to note that when any electrical connector 46 engages its respective terminal 44, the connector 46 and the electrical conductor 48 mounting it either are spaced rather closely to the second surface 42 of their associated panel 38 or run therealong. When the electrical connector 46 is disengaged from its terminal 44 and is thereafter associated with the device 51 mounted on the adjacent parking stand 50, its electrical conductor 48 is moved away from the panel 38, as shown at the right in FIG. 1. As explained below, when any electrical connector 46 engages its electrical terminal 44, manipulation of the associated panel 38 to move the fuse 26 from its first or normal inaccessible location to its second accessible location is prevented. In this way, certain untoward events are prevented from occurring. When any electrical connector 46 is disengaged from its terminal 44 and is associated with the device 51 on the associated parking stand 50, the respective panel 38 may be manipulated to move the fuse 26 between its two locations in a safe manner.

The article or device 22 associated with the mounting 20 need not be an electrical component such as the fuse 26. If the article or device 22 is an electrical component, it may be any kind of electrical component which it is desired to be affixed to the panel 38 so that it may be selectively rendered accessible or inaccessible. Whereas in specific examples hereof, the article or device 22 is the high voltage fuse 26, such fuse 26 may be one which embodies one or more of the inventions of the following commonly-assigned U.S. Pat. Nos: 4,193,053; 4,192,534; 4,186,365; 4,159,185; 4,158,830; 4,153,893; 4,109,227; 4,103,270; 4,075,755; and 4,045,758. As is well known, when the high-voltage fuses 26 are used within enclosures 24, they are each usually associated with some sort of exhaust control device 52, as generally depicted in FIGS. 3b, 5a–5e. The exhaust control device 52 may be of a type which utilizes one or more of the inventions of the following commonly-assigned U.S. Pat. Nos.: 4,001,750; 3,965,452; 3,719,912; 3,391,368; and 3,230,331. The enclosure 24 may be of any style. Where the enclosure 24 houses high-voltage gear 28, it may embody one or both inventions of the following commonly-assigned U.S. Pat. Nos.: 4,102,475 and 3,572,062. If the high-voltage gear 28 includes one or more switches (not shown, but discussed above) in electrical series with the fuses 26, such switches may embody one or more of the inventions of the following commonly-assigned U.S. Pat. Nos.: 4,169,973; 3,676,629; 3,671,697; 3,576,967; 3,563,102; and 3,549,840.

Mounting 20—General

FIGS. 5a–5e generally depict the mounting 20 of the present invention and illustrate how it may be manipulated between a first or normal position and a second position to move the fuse 26 from an inaccessible location within the enclosure 24 to an accessible location outside the enclosure 24, the opening 36 being covered or blocked by the panel 38 in both positions. FIGS. 5a–5e only generally or schematically, if at all, illustrate many of the details and features of the mounting 20, the panel 38, the enclosure 24, and other portions of the high-voltage gear 28. Other FIGURES, discussed below, illustrate preferred embodiments of these details and features; it is not necessary to discuss these other FIGURES in order for the basic concepts embodied in the mounting 20 to be understood.

FIG. 5a (and FIGS. 1, 3 and 4) illustrates the mounting 20 in its normal or first position, wherein the fuse 26 is inaccessibly located within the enclosure 24. Reference numeral 54 indicates the outside surface of the wall 34 which will be observed by a workman following opening of the door 30. The reference numeral 56 generally designates the interior of the enclosure 24, the majority of which is not depicted in FIG. 5a.

The enclosure 24, including one or more walls 34, one or more doors 30, and a roof 58 are preferably constructed of metal. The panel 38 is also preferably constructed of metal, but may be made of an insulative material, if desired.

Referring to FIGS. 1, 3a, 3b, 4, and 5a, the panel 38 comprises a generally flat, rectangular metal plate 60 which has a greater height than width. This relationship of the height of the panel 38 and its plate 60 to the width thereof need not necessarily obtain. The sides of the plate 60 may be deformed into side flanges 62 so that the panel 38 is strong and rigid. In the first or normal position of the panel 38, the side flanges 62 may face outwardly, that is, to the outside of the enclosure 24. The first surface 40 of the panel 38, which faces the interior 56 of the enclosure 54 in the first position of the panel 38, is preferably essentially flat. The second surface 42 of the panel 38 is also preferably essentially flat and is bounded by the side flanges 62. For purposes of later describing the operation of the mounting 20, the reference numerals 64 and 66 have been used to indicate a first end and a second end of the panel 38 (and its plate 60) which bound the surfaces 40 and 42.

Preferably, each opening 36 through the wall 34 has a shape complementary to that of both surfaces 40 and 42 of its panel 38, specifically, a rectangular shape oriented with its long dimension vertical. As discussed below, other shapes for the panel 38 and the opening 36 are possible, as are non-flat walls 34 and panels 38.

As seen in FIGS. 1, 3a, 4 and 5a, in the first or normal position of the panel 38, the panel 38 substantially covers or blocks the opening 36 and there is no significant point of ingress to the interior 56 of the enclosure 54. In this position of the panel 38, the first end 64 thereof is adjacent a first end 68 of the opening 36, while the second end 66 of the panel 38 is adjacent a second end 70 of the opening 36.

The fuse 26 is affixed to the first surface 40 of the panel 38 by facilities generally designated with the reference numerals 72 and 74. The affixing facilities 72 and 74, as described in greater detail below, mount the fuse 26 to the first surface 40 of the panel 38 in insulated, spaced relationship therefrom. Preferably, the upper affixing facility 72 (as viewed in FIG. 5a) includes the terminal 44, which may be an integral bushing or a bushing insert-bushing well combination. The upper affixing facility 72 may also include a skirted insulator 76, only generally illustrated in FIG. 5a, which is attached to or formed integrally with the terminal 44. Regardless of the construction of the affixing facility 72, including its terminal 44 and its insulator 76, the terminal 44 includes a conductive portion (not shown) which may be selectively electrically engaged with a conductive portion (not shown) of the electrical connector 46 depicted in FIG. 1. This conductive portion of the terminal 44 is electrically connected through the terminal 44 and the insulator 76 to a conductive member generally indicated at 78. The conductive member 78 may take any convenient form and in FIG. 5a is generally shown as a clip-type contact which mechanically and electrically engages an end ferrule 80 at the end 26b of the fuse 26. Thus, the conductive portion of the terminal 44, which is electrically engageable by the electrical connector 46, is electrically continuous with the end ferrule 80 of the fuse 26. The insulator 76 mechanically mounts the end ferrule 80 of the fuse 26 to the first surface 40 of the panel 38 and spaces the end ferrule 80 insulatively away from the panel 38. This is achieved because the outer visible portion of the terminal 44, as viewed in FIG. 5a, is held in and insulatively passes through a hole or opening (not shown) formed in the plate 60 of the panel 38. This insulative attachment of the affixing facility 72 to the plate 60 may be achieved by any well-known technique.

The lower affixing facility 74 (as viewed in FIG. 5a) may comprise a skirted insulator 82 attached at one end in any convenient fashion to the first surface 40 of the panel 38. The other end of the insulator 82 mounts a conductive fuse mounting assembly, generally indicated by the reference numeral 84, which mechanically and electrically connects to a ferrule 86 at the end 26a of the fuse 26. The fuse mounting assembly 84 is constructed so as to accommodate the exhaust control device 52 which is attached to the end ferrule 86. Thus, the insulator 82 and the fuse mounting assembly 84 mechanically mount the fuse end ferrule 86 in insulated, spaced relationship relative to the panel 38.

Also mechanically and electrically attached to either the end ferrule 86 or to the fuse mounting assembly 84 may be a stud contact assembly generally indicated at 88. If the fuse 26 has not operated, there is electrical continuity between the stud contact assembly 88 and the conductive member 78 at the end 26b of the fuse 26.

The stud contact assembly 88 includes a stud contact 90 which is electrically continuous with the ferrule 86. In the first or normal position of the panel 38, as depicted in FIG. 5a, the stud 90 mechanically and electrically engages a stationary electrical contact 92 within the interior 56 of the enclosure 54. The contact 92 may be mounted within the enclosure 24 in any convenient manner. Moreover, the contact 92 may be electrically connected by conductors, such as appropriate bus work, to an electrical power source or to one or more of the switches (not shown) located elsewhere within the enclosure 24. When, as shown in FIG. 1, the electrical connector 46 engages the terminal 44, the electrical conductor 48 mounting the connector 46 is electrically continuous with the electrical contact 92 of FIG. 5a and, therefore, with any electrical power source or switch electrically connected thereto.

Each mounting 20 also includes facilities for attaching its panel 38 to the wall 34. These facilities include a U-shaped channel 94 (see FIG. 2a) mounted to the outside 54 of the wall 34 in any convenient fashion on either side of each opening 36, as best depicted in FIGS. 1, 2, 3a, 3b and 4. One channel 94 is shown from the side in FIGS. 5a–5e. Each channel 94 on either side of each opening 36 defines a track 96, which is at least as long as the height of the opening 36.

Mounted at or near the first end 64 of the panel 38 at either side thereof is a stub roller shaft 98 (FIGS. 3a and 4). The stub roller shafts 98 may be attached to the panel 38 in any convenient fashion, such as by welding or brazing them to the respective side flanges 62 at or near the first end 64 of the panel 38. The stub roller shafts 98 each rotatably mount a roller 100. Each roller 100 is constrained to ride in the track 96 of its respective channel 94 and may contain a depression 100a formed in its outside surface. A ball bearing 101 may be held in the depression 100a for bearing thereagainst and against the side of the track 96. As best shown in FIG. 4, the extent of the stub roller shafts 98 away from the side flanges 62 of the plate 60, the mounting of the rollers 100 thereon, and the size of the ball bearings 101 are such that the rollers 100 cannot leave their tracks 96 and can only move along such tracks 96. Such movement in the case of the embodiment being described is vertical. The ball bearings 101 eliminate side play of the plate 60 and prevent binding of the rollers 100 in the track 96.

The facilities for attaching the panel 38 to the wall 34 also include a pair of links 102. The links 102 are elongated members, one end of which is pivotally connected to the wall 34 and the other end of which is pivotally connected to the panel 38. Specifically, one end of each link 102 is mounted to a pivot rod 104 held in a bracket generally designated 106 in FIG. 5a, which is in turn attached as convenient to the wall 34. The details of the bracket 106 and the pivot rod 104 and the method of attachment of the links 102 thereto are discussed in detail below. The other end of each link 102 is pivotally connected to the panel 38 by a pivot rod 108 held in a bracket generally designated 110 in FIG. 3a, which is attached as convenient to the surface 42 of the panel 38. The details of the pivot rod 108 and the bracket 110 and the mode of pivotal attachment of the links 102 thereto are discussed in greater detail below.

The links 102 and their pivotal attachments between the wall 34 and the panel 38 have two noteworthy preferred characteristics. First, the pivotal attachment of the links 102 via the pivot rod 108 to the panel 38 is preferably positioned generally midway between the ends 64 and 66 of the plate 60 forming the panel 38 when the rollers 100 have their preferred position of at or near the first end 64 of the panel 38. Stated differently, the axis of the pivot rod 108 is preferably generally coincident with the horizontal axis of symmetry of the panel 38. Second, when the rollers 100 have their preferred position, the links 102 are at least as long as one-half the distance between the ends 64 and 66 of the panel 38. As depicted in the FIGURES, the links 102 may have a length which is approximately 1.3 times one-half the distance between the ends 64 and 66 of the panel 38, although the links 102 may clearly have lengths other than that depicted. As best shown in FIGS. 1, 3a and 4, when the panel 38 is in its first or normal position, the links 102 extend between the rods 104 and 108 to the inside of the side flanges 62 and are spaced slightly from and parallel to the surface 42 of the panel 38.

As described in greater detail below, a main latching mechanism is provided to latch or hold the panel 38 in the first or normal position depicted in FIG. 5a, and in a second position depicted in FIG. 5e. For the time being and for the sake of simplicity, this mechanism is not described.

If the panel 38 is in its first or normal position as depicted in FIG. 5a, the fuse 26 is also in a first or normal position within the interior 56 of the enclosure 24, and the first surface 40 of the panel 38 faces such interior 56; the second surface 42 of the panel 38 faces toward the outside of the enclosure 24 and is visible along with the outside surface 54 of the wall 34.

If access to the fuse 26 is desired for any reason—for example, to replace the fuse 26 after it has operated—a pulling force is applied to the second end 66 of the panel 38, as generally indicated by the arrow 112 in FIG. 5a. The application of the pulling force 112 to the second end 66 of the panel 38 initiates movement of the end 66 away from the opening 36 and the wall 34 and upwardly along a curvilinear path, as shown in FIG. 5b. Simultaneously with this movement of the second end 66 of the panel 38, the first end 64 of the panel 38 begins to move downwardly generally coplanarly with or along the opening 36 because of the constraining action of the track 96 on the rollers 100, again as shown in FIG. 5b. Furthermore, the horizontal axis of symmetry of the panel 38 and the axis of the pivot rod 108 move along a circular path away from the wall 34 with the pivot rod 104 as a center of rotation, as shown in FIG. 5b. The pulling force 112 causes the panel 38 to move from the position shown in FIG. 5b to the position shown in FIG. 5c. FIG. 5c represents the maximum amount of movement of the pivot rod 108 away from the wall 34. From the position of the panel 38 shown in FIG. 5c, the momentum of the fuse 26, the affixing facilities 72 and 74, and the panel 38 cause the first end 64 of the panel 38 to continue to move downwardly, generally coplanarly with or along the opening 36, as the second end of the panel 66 continues to follow a curvilinear path upwardly and toward the wall 34, as shown by comparing FIGS. 5c to 5d. Note in comparing FIGS. 5c and 5d that, following the position of the panel 38 shown in FIG. 5c, the pivot rod 108 begins to move back toward the wall 34. Finally, due either to the application of a pushing force, generally represented by an arrow 114 in FIG. 5d, or simply due to the momentum of the entire system, the second end 66 of the panel 38 moves into adjacency with the first end 68 of the opening 36 and the first end 64 of the panel 38 moves into adjacency with the second end 70 of the opening 36, as shown in FIG. 5e. Because of the position of the rollers 100 at or near the end 64 of the panel 38, and because of the location of the pivot rod 108 midway between the ends 64 and 66 of the panel 38, the panel 38 again covers or blocks the opening 36, as shown in FIG. 5e.

As shown in FIG. 5e, which depicts the second position of the panel 38 (see also FIG. 3b), both the first surface 40 of the panel 38 and the fuse 26 are now located outside the enclosure 24 (or on the same side of the wall 34 as its surface 54 is located) and the fuse 26 is accessible. The second surface 42 of the panel 38 now faces the interior 56 of the enclosure 24 and is inaccessible. It should further be noted that the action depicted in going from FIG. 5a to FIG. 5e represents the panel 38 being simultaneously moved and translated (or pivoted) end-for-end relative to the opening 36. As described, such simultaneous movement and end-for-end translation (or pivoting) of the panel 38 is characterized by the movement of various portions of the panel 38 toward, away from or along the wall 34 and the opening 36 at the same time the panel translates (or pivots or rotates) about the pivot rod 108 as the panel ends 64 and 66 reverse their relationship relative to the opening 36. This action, of course, presents the fuse 26, its exhaust control device 52, and the affixing facilities 72 and 74 in a location and orientation which is upside-down relative to that depicted in FIG. 5a, but which is accessible from outside the enclosure 34.

Several characteristics exhibited by the simultaneous movement and end-for-end translation of the panel 38 (going from FIG. 5a to FIG. 5e) used in preferred embodiments should be noted. First, the coaction of the rollers 100 and the track 96 constrains the first end 64 of the panel 38 to follow a path which is generally coplanar with or along the opening 36. Stated differently, the first end 64 of the panel 38 experiences no substantial amount of movement into the interior 56 of the enclosure 24. Second, the second end 66 of the panel 38 is constrained to follow a curvilinear path. The curvilinear path is a degenerate parabola having varying configurations depending on the ratio of the length of the links 102 to one-half the distance between the ends 64 and 66 of the panel 38. Third, the axis about which the panel 38 pivots—its horizontal axis of symmetry which is coincident with the pivot rod 108—is constrained to move along a circular arc away from, and then back toward, the wall 34. Fourth, in both the first or normal position of the panel 38 as shown in FIGS. 1, 3a, 4 and 5a, and in the second position of the panel 38, wherein the fuse is accessible, as shown in FIGS. 3b and 5e, the opening 36 is preferably substantially covered or blocked by the panel 38. This covering or blocking of the opening 36 by the panel 38 in both positions thereof offers a distinct advantage over fuse-mounting schemes wherein an opening is partially or wholly uncovered while the fuse 26 is accessible, as discussed above. Fifth, as shown by going from FIGS. 5a to 5b, at the inception of the simultaneous movement and end-for-end translation or pivoting of the panel 38, the stud contact 90 slides along and disengages the stationary electrical contact 92. Further, due to the movement and end-for-end translation or pivoting of the panel 38, and due to the constraining of the first end 64 of the panel 38 to follow a path generally coplanar with or along the opening 36, the ends 26a and 26b of the fuse 26, the exhaust control device 52, and the mounting facilities 72 and 74 are not interfered with by the stationary contact 92 during movement of the panel 38. Sixth, all of the movement and end-for-end translation or pivoting of the panel 38 may be achieved entirely outside the enclosure 24. Further, no part of the fuse 26, its exhaust control device 52, or the affixing facilities 72 or 74 need be inserted into the interior 56 of the enclosure 24 during movement and end-for-end translation or pivoting of the panel 38 any farther than they are inserted in the first or normal position of the panel 38.

As discussed in detail below, the manipulation of the panel 38 which achieves the simultaneous movement and end-for-end translation or pivoting thereof to move the fuse 26 from an inaccessible location within the interior 56 of the enclosure 24 to an accessible location outside the enclosure 24, may be achieved remotely from the wall 34 of the enclosure 24 with an elongated insulated tool, such as a "hot stick" or a so-called "shotgun stick" (not shown). As will be seen, a "shotgun stick" may also be used to manipulate the electrical connector 46 for engagement with or disengagement from the terminal 44 and to remove the fuse 26 from the affixing facilities 72 and 74 once the fuse 26 is rendered accessible, both remotely from the wall 34 of the enclosure 24. The ability to perform all of these functions from a distance and the covering or blocking of the opening 36 by the panel 38 in both positions thereof, as well as the electrically grounded nature of the wall 34 and of the panel 38, render the gear 28 extremely safe and convenient to work on.

Once the fuse 26 has been moved from the location depicted in FIG. 5a to the location depicted in FIG. 5e and has been examined, replaced or the like, the fuse 26 may once again be moved to its inaccessible location within the interior 56 of the enclosure 24. This is achieved by applying a pulling force, generally represented by the arrow 116 in FIG. 5e to the second end 66 of the panel 38 which is now located adjacent the first end 68 of the opening 36. The application of such a pulling force 116 until the panel 38 achieves the position shown in FIG. 5c (after assuming the position shown in FIG. 5d) permits the momentum of the panel 38, the fuse 26 with its exhaust control device 52, and the affixing facilities 72 and 74 to continue moving the panel 38 from the position shown in FIG. 5c to the positions shown in FIG. 5b and FIG. 5a. During this movement and end-for-end translation of the panel 38, the stud contact 90 slidingly re-engages the stationary electrical contact 92 to re-establish electrical continuity between the conductive portion (not shown) of the terminal 44 and the stationary electrical contact 92.

As the present invention has been thus far described, it has been preferred that the wall 34 and the panel 38 are substantially planar or flat. Although flat walls 34 are typical in high-voltage switchgear of the type 28 depicted herein, and although a flat panel 38 has the simpliest shape permitting covering or blocking of the opening 36 in both positions of the panel 38, it should be obvious to those skilled in the art that both the wall 34 and the panel 38 may have some configuration other than planar, for example, curved or bowed. Moreover, although the wall 34 is vertical, it and the opening 36 may be horizontal or slanted. As viewed in FIGS. 1-5, both the opening 36 and the panel 38 preferably have symmetrical rectangular shapes which are oriented with their long dimensions vertical. It should be appreciated that these configurations of the opening 36 and the panel 38 are not necessary. For example, both the panel 38 and the opening 36 could be rectangular and oriented with their long dimensions horizontal.

Further, regardless of the orientation of the opening 36 and the panel 38, it is not necessary that their shapes be rectangular at all or, for that matter, be similar. Other shapes, such as square or round, may be taken by the opening 36 and the panel 38, as long as the panel 38 in both of its positions has the capability of substantially covering or blocking the opening 36. As described with reference to the specific embodiments of FIGS. 1-5, the opening 36 and the panel 38 may be viewed as having any configuration as long as they each have an axis of symmetry which generally coincides in both positions of the panel 38 (so that the panel 38 substantially covers the opening 36), the axis of symmetry of the panel 38 being the axis about which the panel 38 translates or pivots end-for-end during its simultaneous movement and translation or pivoting relative to the opening 36. According to this view, each surface 40 and 42 of the panel 38 has a shape complementary to the opening. As should be clear, neither the panel 38 nor the opening 36 need be symmetrical.

Additionally, as should be obvious, the panel 38 need not move and translate or pivot vertically end-for-end relative to the opening 36, but may also move and translate or pivot side-for-side in a horizontal sense. Stated differently, the mounting 20 of the present invention may also be used if the orientation of the opening 36 and of the panel 38 were as would be viewed with FIGS. 1-4 rotated 90° in either direction. Thus, as used herein, end-for-end movement and translation includes side-for-side movement and translation, regardless of whether the wall 34 is vertical, horizontal or on a slant.

Two links 102 are not necessary. A single link 102 or three or more links 102 may be used. Also, the links 102 need not be straight. Moreover, more or less than two rollers 100 may be used, and the rollers 100 may be replaced by simple studs or other projections guided by the tracks 96 or similar elements. Clearly, the channel 94 need not be U-shaped and may take any configuration sufficient to guide the rollers 100 or other members used in place of the rollers 100.

In preferred embodiments, the panel 38 substantially covers or blocks the opening 36 in both of its positions. To this end, as already discussed, the panel 38 preferably has substantially the same size and shape as the opening 36. It should be obvious, however, that the panel 38 could also be made substantially larger than the opening 36 and that the panel 38 and the opening 36 could therefore take any various shapes and configurations. This is made possible, in part, by the fact that, as already described, no part of the panel 38 need move through the opening 36 into the interior 56 of the enclosure 24 during the simultaneous movement and end-for-end translation or pivoting thereof due to the constraining action of the tracks 96 interacting with the rollers 100. Moreover, the panel 38 may be made somewhat smaller than the opening 36 or, if panel 38 is symmetrical, it may pivot end-for-end on an axis other than its axis of symmetry. In either of these latter two events, points of ingress of various sizes into the enclosure 24 may be present in one or both positions of the panel 38. However, some points of ingress of small size may be tolerable under given field conditions.

In the preferred embodiments thus far described, the channels 94 and their tracks 96 are substantially straight and vertical and are connected to the vertical, flat wall 34. Besides being obvious that the channels 94 may be vertical, horizontal or slanted—depending on the general orientation taken by the wall 34—it should also be obvious that the channels 94 and their tracks 96 need not be straight and may be bent or curved to some degree relative to the wall 34 as long as the panel 38 is permitted to be manipulated for simultaneous movement and end-for-end translation or pivoting. Furthermore, the channel 94, regardless of its orientation or curvature, may be mounted directly to the wall 34 or may have one end slightly spaced away or angled slightly away from the wall 34. As a consequence of the various types, shapes and orientations that the wall 34, the opening 36, the panel 38 and the channel 94 may take, the statement that the first end 64 of the panel 38 is constrained to follow a path which is generally coplanar with or along the opening 36 is intended to describe both the specific preferred embodiments depicted in the FIGURES, as well as deviations therefrom in which the wall 34 is other than flat, in which the channel 94 is other than straight, and in which the channel 94 is other than flush with the wall 34. The same statement is also intended to cover variations of the present invention wherein the channel 94 and its track 96 are mounted to the interior surface of the wall 34. Also, as should be clear, the distance of the channels 94 from the opening 36 may be varied. Such variation will depend, for example, on the shapes of the panel 38 and the opening 36 and on the space available.

In preferred embodiments, the rollers 100 are mounted at or near the end 64 of the panel 38. This position of the rollers permits the simultaneous movement and end-for-end translation of the panel 38 without substantial entry of the end 64 into the interior 56 of the enclosure 24. In many cases, notably where the interior 56 of the enclosure 24 contains energized live parts, this lack of substantial entry of the panel end 64 thereinto is desirable, if not necessary. However, depending on the contents of the enclosure 24—indeed, there need be no electrical components inside the enclosure 24—entry of some or a substantial portion of the panel 38 may be tolerable. Accordingly, the present invention also contemplates the rollers 100 being positioned away from the panel end 64 and toward the pivot rod 108. In the event the rollers 100 are not at or near the end 64, such end 64 will protrude into the interior 56 of the enclosure 24 and follow a curvilinear path while therewithin. The maximum protrusion will be, of course, the distance between the stub shafts 98 and the end 64 and will be achieved when the panel is horizontal during its movement and end-for-end translation.

Preferably, as noted, the rollers 100 are at or near one end, e.g., the end 64, of the panel 38 and the pivot rod 110 is located midway between the panel ends 64 and 66, and the links 102 are about 1.3 times the distance between the pivot rod 108 and either end 64 or 66. However, as also discussed, the rollers 100 need not be at or near a panel end 64 or 66 (in which case one of the ends will follow a curvilinear path within the enclosure 24 and one end will follow a curvilinear path outside the enclosure) and the links 102 may have varying lengths. About the only significant limitation on the length of the links 102 is that such length between the pivot rods 104 and 108 must be equal to or greater than the distance between the pivot rod 108 and the axis of the rollers 100. As can be demonstrated, if the length of the links 102 between the pivot rods 104 and 108 is less than the distance between the axis of the rollers 100 and the pivot rod 108, the panel 38 cannot move and translate. The limiting case, where the length of the links 102 is substantially equal to the distance between the pivot rod 108 and the axis of the rollers 100, results in a type of "two-step" movement of the panel 38, which is, nevertheless, intended to be encompassed by the phrase "simultaneous movement and end-for-end translation (or pivoting)." Such "two-step" movement is characterized by 90° circular pivoting of the pivot rod 108 and of one end 64 or 66 of the panel 38 away from the wall 34 about the pivot rod 104 and the rollers 100, with the rollers 100 not moving along the track 96, followed by movement of the rollers 100 along the track 96 and movement of the pivot rod 108 back toward the wall 34 as the panel again covers or blocks the opening 36.

In one alternative to the above generally described preferred embodiments of the present invention, the terminal 44 and the electrical connector 46 are not utilized. Specifically, as shown in FIG. 6 which is similar to the upper portion of FIG. 5a, the affixing facility 72 may be replaced by an affixing facility 72' which comprises a skirted insulator 118 mounted at one end to the first surface 40 of the panel 38. Either the other end of the facility 72' or the ferrule 80 of the fuse 26 may carry a stud contact assembly 120. The stud contact assembly 120 may be similar to the stud contact assembly 88 and is electrically continuous with the ferrule 80 of the fuse 26. The stud contact assembly 120 includes a stud contact 122 which, in the first or normal position of the panel 38, electrically engages a stationary electrical contact 124 mounted as convenient within the interior 56 of the enclosure 24. The stationary electrical contact 124 is connectable either directly via conductors, bus work or one or more other components (such as switches) within the enclosure 24 to the electrical load. In this alternative, the motion of the panel 38 during its simultaneous movement and end-for-end pivoting is such that the stud contact 122 disengages the stationary electrical contact 124 in a manner similar to disengagement of the stud contact 90 from the stationary electrical contact 92. The end 26b of the fuse 26 is in no way interfered with by the stationary contact 124 because of the path taken thereby. Thus, the mounting 20 of the present invention may include two stationary electrical contacts 92 and 124 which are respectively normally contacted by stud contacts 90 and 122 and which are disengagable therefrom during the simultaneous movement and end-for-end translation or pivoting of the panel 38. Unless the stud contacts 90 and 122 and the stationary contacts 92 and 124 have load-break capabilities, movement of the panel 38 in this alternative embodiment must be preceded by de-energization of the fuse 26 and of the portion of the circuit "downstream" from the fuse 26. Such de-energization may be achieved as convenient, for example, by opening a load-break switch (not shown) of the gear 28 in series with one of the stationary contacts 92 and 124.

FIG. 7 is a general representation of the various paths taken by various portions of the mounting 20 of the present invention during the simultaneous movement and end-for-end pivoting of the panel 38. It should be understood that the exact shape of these paths will change as the relationship of the length of the links 102 is changed relative to the distance between the pivot rod 108 and the axis of the rollers 100. FIG. 7 also depicts the location of the stationary contact 92, as well as the location of the stationary contact 124 where such are used. The path labeled 126 represents the curvilinear path taken by the end 66 of the panel 38 during movement thereof. As already noted, this path is a degenerate parabola. The path labeled 128 is the path taken by the end 64 of the panel 38 which, as already noted, is substantially a straight line and is preferably substantially coplanar with the opening 36, although other deviant paths are permissible, as already discussed. The path labeled 130 is a portion of a circle and represents the path taken by the pivot rod 108 during the simultaneous movement and end-for-end translation or pivoting of the panel 38. The path labeled 132 is the path followed by the stud contact 90 during movement of the panel 38, while the path labeled 134 is the path taken by the stud contact 122 where such is used. Note that both paths 132 and 134 illustrate that the stud contacts 90 and 122 may easily slide toward and away from their respective stationary contacts 92 and 124 during movement of the panel 38 and that neither stationary contact 92 or 124 interferes with movement of the panel 38 by interfering with any item connected thereto.

Details of Panel 38

As already described, the panel 38 is attached to the wall 34 so as to permit simultaneous movement and end-for-end translation thereof relative to the opening 36 to move the fuse 26 between an inaccessible first or normal position within the interior 56 of the enclosure 24 and a second position whereat the fuse 26 is outside the enclosure 24 and is accessible. This attachment of the panel 38 to the wall 34 is achieved by the channel 94 with its track 96, the stub roller shafts 98 with their rollers 100, the links 102, the pivot rods 104 and 108, and the associated brackets 106 and 110. These and related items, some of which are only generally shown, or are not shown at all, in FIGS. 5a–5e, are now described in detail relative to preferred specific embodiments of the invention.

As shown in FIGS. 1 and 2, the channels 94 for each opening 36 are attached to the wall 34 in any convenient fashion and run from just beneath the roof 58 of the enclosure 24 to or past the bottom or second end 70 of the opening 36. As shown in FIGS. 1 and 4, a horizontal member 140 may be attached to the wall 34 to positively clamp the tops of the channels 94 against the wall 34. Referring to FIG. 4, it may be seen that the stub roller shafts 98 are connected to the side flanges 62 of the plate 60 making up each panel 38, and the rollers 100 are rotatably mounted to the stub shafts 98 in such a way that they and the ball bearings 101 are trapped within and constrained to roll along the tracks 96 defined by the channels 94. Due to the length of the stub shafts 98, the spacing between the channels 94 across the openings 36, and the size of the ball bearings 101, the rollers 100 cannot leave the tracks 96.

The bracket 106 which mounts the pivot rod 104 is attached to the wall 34 in any convenient fashion such as by bolts or by welding. The distance of the bracket 106 above the end 68 of the opening 36 is, of course, determined by the length of the links 102, which is in turn determined by the height of the wall 34 and the location of the roof 58. The bracket 106 may comprise a substantially flat plate 142 having upturned flange 144 formed at either end thereof. The flanges 144 have holes 146 therethrough. Low friction spacers 148 may be positioned about the rod 104 at the outside of each flange 144. The links 102 are metallic members and may have a circular cross-section, although other materials and cross-sections are contemplated. The upper ends of the links 102 may be tapered or flattened as shown at 152. The pivot rod 104 passes through holes 154 formed through the tapers 152, which abut the spacers 148 on either side of the flanges 144. The tapers 152 may be held on the rod 104 by split washers 156 or similar fastening or retaining members.

Referring to FIG. 3a, the bracket 110 which holds the pivot rod 108 is similar to the bracket 106. Specifically, the bracket 110 comprises a generally flat plate 160 mounted to the panel 38 in any convenient fashion as by bolts or welding. The ends of the plate 160 are turned out into flanges 162 having holes (not shown) therethrough. The pivot rod 108 also passes through the holes (not shown) in the flanges and through holes (not shown) formed in lower tapers or flattened portions 168 of the links 102 which are similar to the tapers 152. Surrounding both ends of the pivot rod 108 between the side flanges 62 and the tapers 168, and between the flanges 162 and the tapers 168, are low friction spacer bushings 170. The rod 108 is held in place by split washers 172 or the like.

As shown in FIG. 3a, in the first or normal position of the panel 38, the links 102 lie just inside the flanges 62 of the plate 60. Similarly as shown in FIG. 3b, when the panel 38 has been manipulated and simultaneously moved and translated or pivoted end-for-end to its second position (FIG. 5e), the links 102 again lie just inside the flanges 62. In both positions of the panel 38, the links 102 extend along and are slightly spaced from the surface 42 of the panel 38.

As already noted, the pivot rod 108 preferably, but not necessarily, coincides with the axis of symmetry of the panel 38 about which the panel 38 pivots during its simultaneous movement and end-for-end translation or pivoting. If the pivot rod 108 does not coincide with this axis of symmetry, the panel 38 may not cover or block the opening 36 in both positions thereof unless it is made sufficiently larger than the opening 36.

The links 102 may be pivotally mounted to any wall and to any panel in a manner similar to that just described, regardless of the orientation (vertical, horizontal or slanted) of the panel 38 and the wall 34 and regardless of the shape or configuration of the opening 34 and the panel 34. Other equivalent pivotal mountings for the links 102 will be obvious to those having skill in the art.

Interlock Latch Assembly 180

Where the mounting 20 is used with the high-voltage gear 28 which utilizes the terminal 44 and the electrical conductor 48 mounting the electrical connector 46, an interlock latch assembly 180 may be provided. The interlock latch assembly 180 provides extra safety for workmen dealing with the gear 28 and manipulating the panel 38 and ensures a proper sequence of operations.

Referring to FIGS. 1, 3a, 8 and 9, the interlock latch assembly 180 may be seen to include a latch lever 182 pivotally mounted to a bracket 184 which is in turn attached in any convenient fashion to the panel 38. The bracket 184 comprises a generally flat plate 186 having the outer ends thereof out-turned into flanges 188. The interlock lever 182 may be saddle-shaped or U-shaped and may comprise elongated arms 190 interconnected by a bent leg 192 (as depicted) or a straight leg. The end of each arm 190 remote from the leg 192 may be pivotally connected to the flanges 188 by headed pins 194 or equivalent connectors. The headed pins 194 pass through holes 196 and 198, respectively, in the arms 190 and the flanges 188. A low friction bushing 202 may surround each pin 194 and be interposed between each arm 190 and its adjacent flange 188.

Assuming the gear 28 to include the terminals 44 (e.g., integral bushings or bushing insert-bushing well combinations) which may be selectively engaged by the electrical connectors 46 (e.g., loadbreak elbows), the position of the bracket 184 on the panel 38 and the various dimensions of the latch lever 182—such as the length of the arms 190 and the leg 192—are all selected so that with an electrical connector 46 engaging its terminal 44, only a limited amount of rotation of the associated latch lever 182 on its bracket 184 is possible. Specifically, with the electrical connector 46 in place on its terminal 44, the position and dimensions of the latch lever 182 are selected so that, after about 40° to 45° of rotation of the interlock latch lever 182, the leg 192 abuts the body of the connector 46 (or the conductor 48), preventing further rotation of the latch lever 182. As described more fully below, such limited rotation of the latch lever 182 is insufficient to permit the panel 38 to move out of its first or normal position depicted in FIGS. 1, 3a, and 5.

The interlock latch assembly 180 also includes an articulated interlock latch rod 204. The latch rod 204 comprises two parts, an upper elongated rod 206 and a lower latch pin 208. The rod 206 may comprise a metal member having upper and lower tapers or flattened regions 210. For purposes of manufacturing economy, the rod 206 and the links 102 may be similar or the same. The rod 206 is pivotally mounted to the latch lever 182 by an elongated pin 214 running between the arms 190 of the latch lever 182. The ends 216 of the pin 214 have decreased diameters, and are held in and may ride along slots 218 formed in the upper portion of each arm 190 (see FIGS. 8a and 9a). As best shown in FIG. 8a, these slots 218, which have a purpose described below, are oriented at approximately 45° to 55° from the normal vertical orientation of the arms 190 of the latch lever 182. Mounted on and surrounding each end 216 of the pin 214 is a headed, low-friction bushing bearing 220 which is engaged by the walls of its slot 218. Also mounted around the ends 216 of the pin 214 and positioned between the larger diameter portion of the pin 214 and the head of the bushing bearings 220 are low-friction, cylindrical followers 222. Preferably, the rod 206 is carried to one side of the pin 214; the pin 214 may also carry a low-friction washer 224 between the upper taper 210 and the larger diameter portion of the pin 214.

The interlock latch rod 204 is articulted as at 226 (FIGS. 3a and 8b). The lower taper 210 of the rod 206 and an upper portion 228 of the latch pin 208 are pivotally joined together by an appropriate headed pin or stud 230. A low-friction washer 232 may be sandwiched between the taper 210 and the portion 228. The latch pin 208 is mounted for guided, vertical motion by a bracket 232 mounted in any convenient fashion to the panel 38. The bracket 232 compries a flat plate 234 having its ends out-turned into flanges 236. The latch pin 208 passes through guide holes 238 in the flanges 236. A compression spring 240 surrounding the latch pin 208 acts between the upper flange 236 and a split ring 242 or the like held in a groove 244 located at approximately the midpoint of the pin 208. The action of the spring 240 biases a latch tip 246 of the latch pin 208 in a downward direction, as viewed in FIGS. 1 and 3a. The articulation 226 between the rod 206 and the latch pin 208 of the interlock latch rod 24 permits vertical movement of the rod 206 to vertically move the latch pin 208 even though the rod 206 becomes slightly skewed from the vertical due to rotation of the latch lever 182, as described below.

In its normal position (FIGS. 1, 3a, 8a and 9a), the leg 192 of the latch lever 182 points downwardly and the arms 190 extend downwardly from the bracket 184 more or less against or parallel to the second surface 42 of the panel 38. In this position of the latch lever 182, the latch pin 208 passes through and engages a hole 248 formed through a latch plate 250 (see also FIG. 10). If the interlock latch lever 182 is rotated on the headed pins 194 away from the panel 38 as shown in FIGS. 9b-9d, because of the offset between the pin 214 and the headed pins 194, the rod 206 is moved upwardly. This upward movement of the rod 206 moves the latch pin 208 and its latch tip 246 upwardly against the bias of the spring 240. Due to the presence of the articulation point 226, this action occurs even though the rod 206 assumes slightly non-vertical orientations.

Sufficient rotation of the interlock latch lever 182, which is preferably in excess of about 90°, moves the latch tip 246 out of the hole 248 formed in the latch plate 250. The latch plate 250 is mounted to the wall 34 in any convenient fashion near the second end 70 of the opening 36. The latch plate 250 is described in greater detail below. Unless about 90° rotation of the latch lever 182 is achieved, the latch tip 246 is not removed from the hole 248 in the latch plate 250 and, accordingly, the panel 38 is not freed for simultaneous movement and end-for-end translation and pivoting.

As best seen in FIGS. 8c and 9a-9d, the flanges 188 of the bracket 184 have a boot-like configuration including a rounded "toe" portion 252 and a detent 254. The rounded portion 252 is so shaped that as the latch lever 182 is pivoted on the pins 194, the followers 222 on the pin 214 move thereover or closely spaced therefrom. During rotation of the latch lever 182, the spring 240 exerts a downward force on the latch rod 204. Until the followers 222 overlie the tops of the rounded portions 252, the bias of the spring 240 tends to move or hold the latch rod 204 sufficiently downwardly to maintain the latch tip 246 in the hole 248. If the latch lever 182 is rotated sufficiently to position the followers 222 over the tops of the rounded portions 252 (as shown by going from FIG. 8c to FIG. 9d), the followers 222 may enter the detents 254. Until just before the followers 222 enter the detents 254, the pin 214 remains at the lower ends of the slots 218 (as shown in FIG. 9a and 9b). Upon the latch lever 182 reaching the position shown in FIG. 8d, the bias of the spring 240 moves the latch rod 204 slightly downwardly, moving the pin 214 to the other end of the slot 218 and holding the followers 222 in the detents 254. The dimensions of the rounded portions 254 and the detent 254, as well as the length of the latch rod 204, are selected so that when the followers 222 are held in the detents 254, the latch tip 246 is fully removed from the hole 248 in the latch plate 250, and the panel 38 may be manipulated for simultaneous movement and end-for-end translation or pivoting.

As already noted, the engagement of the terminal 44 by the connector 46 permits only limited pivoting of the latch lever 182. This limited amount of pivoting is depicted in FIG. 9b and, as already noted, does not sufficiently move the latch rod 204 upwardly to remove the latch tip 246 from the hole 248 in the latch plate 250. Thus, as long as the electrical connector 46 remains engaged with the terminal 44, the latch tip 246 cannot be disengaged from the latch plate 250 and the panel 38 cannot be simultaneously moved and translated or pivoted end-for-end. If the electrical connector 46 is disengaged from the terminal 44 and is temporarily held by the device 51 attached to the adjacent parking stand 50, both the connector 46 and its conductor 48 are sufficiently removed out of the rotational path of the latch lever 182 so that the position thereof depicted in FIG. 9d may be achieved and the latch tip 246 disengaged from the latch plate 250 to permit movement and end-for-end translation of the panel 38.

After the latch lever 182 has been pivoted to the position shown in FIG. 9d, if the panel 38 is simultaneously moved and translated end-for-end, as shown by going from FIG. 5a to FIG. 5e, the latch lever 182 remains in the position depicted in FIG. 9d due to the action of the spring 240 on the latch rod 204 which holds the followers 222 in the detents 254. Since the interlock latch lever 182 cannot be manipulated after the panel has assumed its second position wherein its second surface 42 and the interlock latch assembly 180 face or are within the interior 56 of the enclosure 24 (see FIG. 3b), the interlock latch assembly 180 is not used in maintaining the panel 38 in its second position.

Main Latch Assembly 260

Preferred specific embodiments of the mounting 29 of the present invention include a main latch assembly 260. Referring to FIGS. 1, 3 and 10-12, the main latch assembly 260 may be seen to include a main latch 262, the bottom latch plate 250, and a top latch plate 264. The main latch 262 may be mounted to the panel 38 at or near the second end 66 thereof. The bottom latch plate 250 is mounted to the wall 34 at or near the second end 70 of the opening 36, and the top latch plate 264 is mounted to the wall 34 at or near the first end 68 of the opening 36. The bottom latch plate 250 cooperates with the main latch 262 to hold the panel 38 in its first or normal position wherein the fuse 26 is inaccessibly located within the interior 56 of the enclosure 24. The top latch plate 264 cooperates with the main latch 262 to hold the panel 38 in its second position wherein the fuse 26 is accessibly located outside the enclosure 24. In order to move the panel 38 from its first position to its second position, both the interlock latch assembly 180 and the main latch assembly 260 must be appropriately manipulated. In order to move the panel 38 from its second position to its first position, only the main latch assembly 260 need be manipulated.

The main latch 262 includes a cover 266 (FIG. 3a) attached at one side to the panel 38 in any convenient manner. The cover 266 may be immediately adjacent the bracket 232. The main latch 262 includes a ring 268, or similar engageable member, having a hole 270 therethrough suitable for engagement and manipulation of the ring 268 by an insulated "hot stick, " "shotgun stick," or the like. If the ring 268 is pivoted or rocked toward or away from the panel 38 in either position of the panel 38 (that is into or out of the plane of FIGS. 3a or 3b), a pair of latch teeth 272 are moved from their normal outward position, depicted in FIGS. 3a and 3b, toward the interior of the cover 266. When the latch teeth 272 are in their normal position depicted in FIGS. 3a, 3b, 12a or 12b, they are engageable with one of the latch plates 250 or 264 to hold the panel 38 in its first or its second position. In order to move the panel 38 between its first and second positions, the ring 268 must be first appropriately manipulated to remove the latch teeth 272 from engagement with one of the latch plates 250 or 264.

As best shown in FIG. 10a, the bottom latch plate 250 comprises a plate-like member 274, which includes a generally horizontal portion 276 and a downwardly sloping, front lip or cam portion 278. The portions 276 and 278 of the member 274 include a cruciform slot 280. The cruciform slot 280 is formed in the member 274 to the side of the hole 248 which is formed in the horizontal portion 276. An arm 282 of the cruciform slot 280 which is generally perpendicular to the plane of the wall 34 permits the ring 268 of the main latch 262 to enter therein when the panel 38 is in its first or normal position. Arms 284 of the cruciform slot 280 which are generally parallel to the wall 34 permit entry thereinto of the latch teeth 272 when the panel 38 is placed in its first or normal position. The latch teeth 272 are spring-biased to the normal position, shown in FIGS. 3a, 3b, 12a and 12b. Thus, movement of the panel 38 into its first or normal position causes the latch teeth 272 to engage and move over the lip or cam portion 278 of the member 274, and the latch teeth 272 are moved inwardly of the frame and cover 266 thereby. This continues until the portions 284 of the cruciform slot 280 are reached, at which point the latch teeth 272 enter the portions 284 under spring bias to hold the panel 38 in its first or normal position.

Other than the absence of the hole 248, the top latch plate 264 is similar to the bottom latch plate 250, and, as depicted in FIG. 10b, similar reference numerals have been used to designate the various portions and features thereof. As the panel 38 is moved to its second position (as in FIG. 3b), the latch teeth 272 ride over the lip or cam portion 278 of the top latch plate 264 until under spring bias they enter the portions 284 of the cruciform slot 280. Also, in the second position of the panel 38, the ring 268 of the main latch 262 enters the portion 282 of the cruciform slot 280.

Figure 12A:
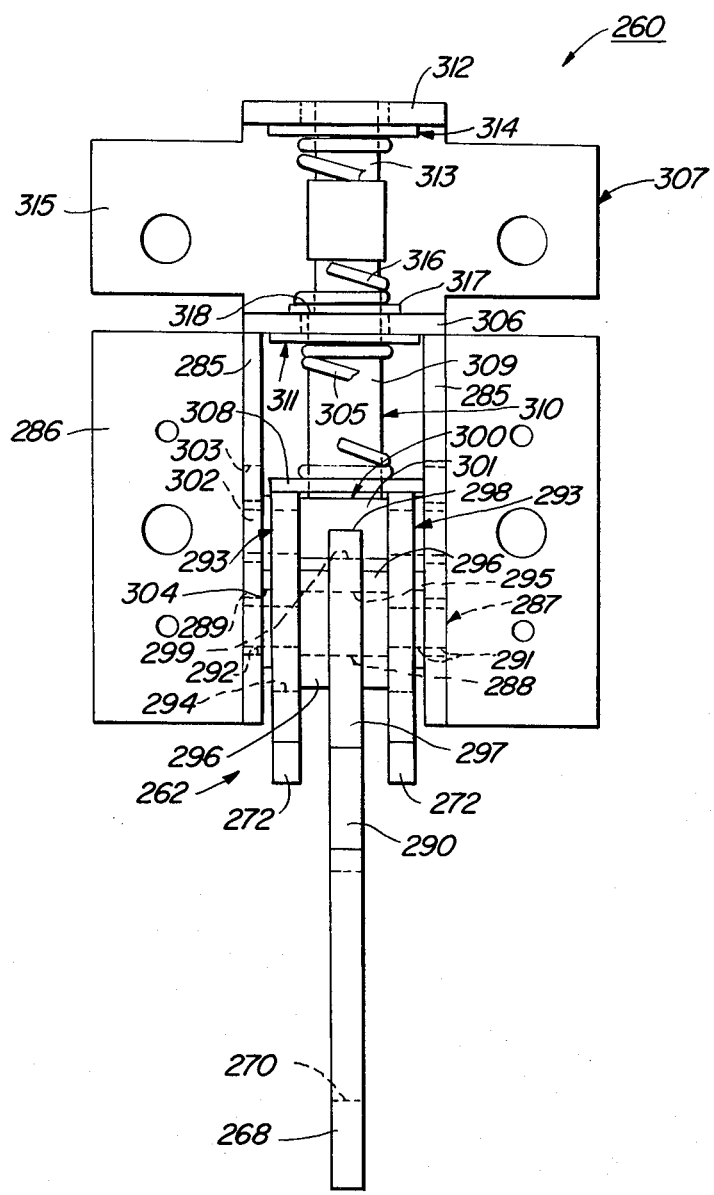
FIGS. 12a and 12b are, respectively, a front elevation and a side elevation of the main latch for holding the panel in its two positions.
Figure 12B:
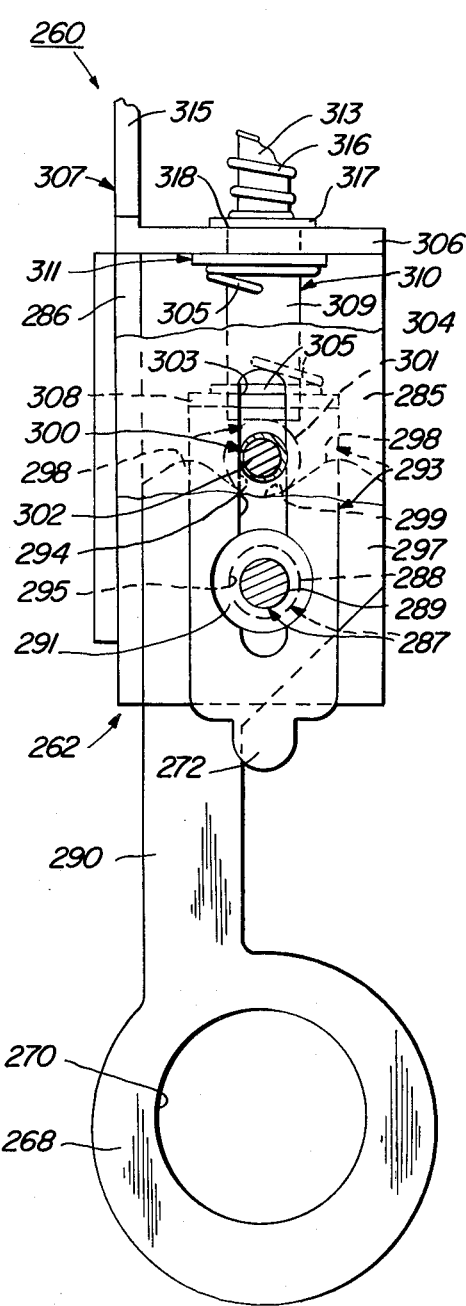

Referring to FIGS. 12a and 12b (in which the cover 266 is not shown), the main latch 262 may be seen to comprise a pair of parallel side walls 285 turned outwardly at their backs into mounting flanges 286 which are mountable to the plate 60 of the panel 38 in any convenient manner. A pin 287 having a central, larger diameter portion 288 and smaller diameter ends 289 pivotally mounts a stem 290, which is integral with the ring 268, between the side walls 285. Mounted around the pin ends 289 are headed, low friction bushing bearings 291 which are held in holes 292 formed through the side walls 285. The heads of the bearings 291 reside between the side walls 285 and respective latch slides 293, at the lower ends of which are formed the latch teeth 272. The latch slides 293 are held on the ends 289 of the pin 287 for vertical motion, via slots 294 formed therethrough, by abutment between the slides 293 and both the heads of the bearings 291 and the central pin portion 288. The stem 290 contains a hole 295 through which the central portion 288 of the pin 287 passes, and a pair of low friction washers 296 surrounding the portion 288 space the stem 290 from the slides 293.

The stem 290 has an upper, enlarged portion 297 which contains the hole 295 and an upper surface of which is formed into two protruding cam lobes 298 separated by a depression 299. Pivoting or rocking of the ring 268 moves the depression 299 out of the position shown in FIG. 12b and moves one of the cam lobes 298 thereinto.

A pin 300 having a central, larger diameter portion 301 and smaller diameter ends 302 is held between the side walls 285 for vertical sliding in slots 303 formed in the side walls 285, which slots 303 hold headed, low-friction bushing bearings 304 surrounding the pin ends 302. With the pin 300, the cam lobes 298 and the slides 293 in their normal position, as shown in FIGS. 12a and 12b, the tops of the slots 294 engage the pin 300 which also rests at the bottom of the slots 303.

The slides 293 are held in their normal position by a compression spring 305 of moderate spring constant acting between a lower flange 306 of a mounting plate 307 and a washer 308 abutting the tops of the slides 293. The mounting plate 307 is attached to the plate 60 of the panel 38 just above the side walls 285 and flanges 286 in any convenient manner. If an upward force is applied to the slides 293, as occurs when the latch teeth 272 slide over the cam lip 278 of either mounting plate 250 or 264, the teeth 272 and the slides 293 move upwardly against the bias of the spring 305 as the slots 294 move relative to the pins 287 and 300. This movement may continue until the bottom of the slot 294 contacts the pin 287. When the teeth 272 overlie the arms 284 of one of the cruciform slots 280, the spring 305 forces the teeth 272 thereinto.

A larger diameter portion 309 of a pin 310 is surrounded by and maintains the washer 308 centered in place over the slides 293. An end of the pin 310 rests against the larger diameter portion 301 of the pin 300. The spring 305 surrounds and is positioned by this portion 309, which passes through the flange 306 via a headed bushing bearing 311 against the head of which the spring 305 may rest.

The mounting plate 307 also includes an upper flange 312 parallel to the lower flange 306 and through which a smaller diameter portion 313 of the pin 310 may pass via a headed bushing bearing 314. Side members 315 of the mounting plate 307 facilitate mounting thereof to the panel 38 so that the lower flange 305 is directly above and abuts the tops of the side walls 285. A robust, stiff compression spring 316 surrounds the smaller diameter portion 313 of the pin 310 and acts between a washer 317 and the head of the bushing bearing 314. The washer 317 surrounds the pin 310 and is held in place axially therealong by resting on a shoulder 318 defined at the juncture of the two portions 309 and 313 of the pin 310.

As previously described, the teeth 272 and the slides 293 may move against the spring 305 when the teeth contact the cam lips 278 of either latch plate 250 or 264. This movement is independent of any movement of the pin 310. The spring 316 urges the end of the larger diameter portion 309 of the pin 310 against the larger diameter portion 301 of the pin 300, thereby normally holding the ends 302 of the pin 300 firmly against the bottoms of the slots 303 and the portion 309 in the depression 299 in the enlarged portion 297 of the stem 290. If the ring 268 and its stem 290 are pivoted or rocked in either direction (leftwardly or rightwardly in FIG. 12b) on the pin 287, one of the cam lobes 298 is moved beneath the portion 301 of the pin 300, moving the pin 300 upwardly against the bias of the spring 316. Upward movement of the pin 300 moves its ends upwardly in the slots 303 and moves the slides 293 and the latch teeth 272 thereon upwardly, due to engagement of the pin 300 with the upper ends of the slots 294 in the slides 293. Thus, the latch teeth 272 may be moved inwardly of the cover 266 either by their contact with the latch plates 250 or 264 or by rocking movement of the ring 268. In the former event, the latch teeth 272 work against only the bias of the spring 305, while in the latter event, the ring 268 moves against the bias of both spring 305 and 316.

Operation of the Mounting 20

The operation of the mounting 20 of the present invention is now described.

After opening the door 30 of the enclosure 24, as in FIG. 1, the wall 34 and the panels 38 are exposed. If, as is typical, the high-voltage gear 28 is connected to a three-phase high-voltage circuit, three such panels 38 are exposed. Assuming that the gear 28 is of the type utilizing the electrical connectors 46 and the terminals 44 for each phase of the electrical circuit, the terminal 44 on each panel 38 will be engaged by an electrical connector 46 mounted by its associated electrical conductor cable 48. As already noted, the presence of the electrical connectors 46 on their terminals 44 prevents operation of the interlock latch assembly 180. Thus as viewed in FIG. 1, each panel 38 is prevented from moving out of its first or normal position by both the interlock latch assembly 180 and the main latch assembly 260.

In the first or normal position of each panel 38, the fuse 26 affixed to the first surface 40 thereof by the affixing facilities 72 and 74 is inaccessibly located within the interior 56 of the enclosure 24. Referring to FIGS. 1, and 2, depending upon the nature and construction of the fuses 26, one or more windows of either the type indicated at 322 or 324 may be present through appropriate locations of the wall 34 in order to view appropriate indicators (not shown) on the fuses 26. See commonly-assigned U.S. Pat. Nos. 4,186,365 and 4,153,893 for two types of such indicators. Viewing the indicators indicates the condition—blown or unblown—of the fuses 26. The windows 322 and 324 are made of a strong, transparent material.

Assuming that it is necessary or desirable to gain access to one or more of the fuses 26, a workman would perform the following steps using the well known insulated "shotgun stick" (not shown) or a similar tool for all of the steps. As noted below, some of the steps may be performed with a "hot stick" (not shown).

An appropriate insulated parking bushing, feed-thru parking bushing or other device 51 is first connected to an appropriate parking stand 50 with the "shotgun stick" (see FIG. 1). The "shotgun stick" is then utilized to remove the adjacent electrical connector 46 from its terminal 44. If the electrical connector 46 is a loadbreak elbow and if its terminal 44 is appropriately constructed, this removal will break or interrupt any load current flowing in the circuit including the conductor 48 and the fuse 26 to which access is to be gained. Following removal of the electrical connector 46 from its terminal 44, the connector 46 is engaged with the device 51 previously affixed to the parking stand 50. This action moves the connector 46 and its associated electrical conductor 48 out of the way of the latch lever 282 (see the right of FIG. 1). The latch lever 182 may now be manipulated (as shown in FIGS. 9a-9d) with the "shotgun stick" (or with a "hot stick") to achieve its full rotation, removing the latch tip 246 of the interlock latch 204 from the hole 248 in the lower latch plate 250.

Next the "shotgun stick" (or a "hot stick") is attached to the ring 268 of the main latch assembly 260 via the hole 270 therethrough. Pulling back on the "shotgun stick" rocks the ring 268 outwardly to remove the latch teeth 272 from the cruiciform slot 280 in the latch plate 250. Having disengaged the latch teeth 272 from the lower latch plate 250, the workman may now pull on the "shotgun stick" thereby pulling on the ring 268 to simultaneously move and translate or pivot end-for-end the panel 38, as described above. This simultaneous movement and end-for-end translation of the panel 38 moves it from its first position, as depicted in FIGS. 1, 3a, 4 and 5a, to its second position, as depicted in FIGS. 3b and 5e, whereat the fuse 26 is rendered accessible. Upon the panel 38 reaching its second position, the latch teeth 272 enter the cruciform slot 280 in the top latch plate 264 holding the panel 38 in its second position. As noted above, the latch lever 182 remains in its fully rotated position (FIG. 9d) and is now located within the interior 56 of the enclosure 24. As shown in FIGS. 3b and 5e, the fuse 26 is accessible in a position which may be considered "upside-down" from its normal position within the enclosure 24. In the second position of the panel 38, the opening 36 is covered or blocked as it was with the panel 38 in its first position.

After the fuse 26 is rendered accessible by moving the panel 38 to its second position, a pull-ring 326 or similar device on the end ferrule 86 (FIG. 3b), and preferably forming a portion of the stud contact assembly 88, may be manipulated with the "shotgun stick" to release the end 26a of the fuse from the mounting assembly 84 and the end 26b from the member 78. Following inspection or replacement of the fuse 26, it may again be reassociated with the affixing facilities 72 and 74, following which the panel 38 may be simultaneously moved and translated end-for-end back to its first position. This requires manipulation of the ring 268 to release the latch teeth 272 from the top latch plate 264. Following this, the "shotgun stick" (or a "hot stick") remains engaged with the ring 268 to move and translate or pivot end-for-end the panel 38 back to its first or normal position.

After the panel 38 has reassumed its first or normal position, The "shotgun stick" (or a "hot stick") is used to rotate the latch lever 182 to its normal position (FIG. 9a). This causes the latch tip 246 to again engage the latch plate 250. Next, using the "shotgun stick," the electrical connector 46 may be disengaged from the insulated parking bushing or other device 51 on the parking stand 50 and may be reconnected with its terminal 44. A similar sequence of operations may be followed for each panel 38 which is moved to render its fuse 26 accessible.

Affixing Facilities 72 and 74

Referring to FIG. 13, there are shown specific examples of the affixing facilities 72 and 74, which are shown in greater detail than in FIGS. 3b and 5a-5d. As will be appreciated by those having skill in the art, modifications of the affixing facilities 72 or 74 or entirely different embodiments thereof may be utilized with the mounting 20 of the present invention.

FIG. 13 depicts the affixing facilities 72 and 74 in the orientation they assume as viewed in FIG. 5a with the panel 38 in its first position. The affixing facility 72 is shown in solid outline; the affixing facility 74 is shown in partial phantom in order to more clearly illustrate the various elements and parts thereof. If FIG. 13 is rotated 180° so that it is upside-down, the affixing facilities 72 and 74 are then depicted as seen from the perspective of FIG. 5e with the panel 38 in its second position.

The mounting facility 72 comprises two subassemblies, one of which is mounted to and carried by the insulator 76 and the other of which is mounted to and carried by the fuse 26 as an end fitting therefor. Mounted to the insulator 76 by bolts or the like (not shown) is a bracket 330. The bracket 330 comprises a base 332 and a cup-shaped slide-way 334 carried by or integral with the base 332. The inside surface of the slide-way 334 is a concave slide 336 (FIG. 13a) which contains a hole 338 therethrough adjacent the base 332. Attached to the base 332 is a leaf spring 340, a free end of which is spaced therefrom. The base 332 also carries a contact assembly 342 (which is the conductive member 78 of FIGS. 5a-5e), only an outer arm 344 of which is shown. The contact assembly 342 contains a second arm (not visible) similar to and behind the arm 344 into the plane of FIG. 13. Both arms 344 may be carried by or formed integrally with a contact base 346. Between the arms 344 may be appropriate spring, clip or other sliding contact members (not shown) which mechanically and electrically engage a conductive member inserted therebetween.

Carried by the fuse 26, and specifically by the end ferrule 80 thereof, is an end fitting 348. The end fitting 348 includes an enlarged cylindrical portion 350 which is integral with a smaller diameter, elongated cylindrical portion 352. The end fitting 348 is clamped to the end ferrule 80 by a bolt 354 or the like, which pulls together two legs 356 (only one of which is shown) integral with the cylindrical portion 352. The top of the cylindrical portion 352 is flattened on both sides, as at 358, so that the top of the cylindrical member 352 may pass through the hole 338 formed through the slide-way 334. The cylindrical portion 352 also carries at its top a flange or lip 360 which, as shown in FIG. 13, protrudes through the hole 338 and engages the outside surface of the slide-way 334. The tightening of the bolt 354, which pulls the legs 356 together, mechanically and electrically connects the end fitting 348 to the end ferrule 80 of the fuse 26.

As depicted in FIG. 13, once the cylindrical portion 352 is passed through the hole 338 in the slide-way 334, the leaf spring 340 acts against the legs 356, thereby urging the flange or lip 360 rightwardly to hold the end 26b of the fuse 26 in the affixing facility 72. The spring or clip contact members (not shown) located between the arms 344 of the contact 342 electrically and mechanically engage the enlarged cylindrical portion 350 of the end fitting 348.

If the affixing facility 72 is used with embodiments of the present invention which utilize the electrical connector 46, the base 332 of the bracket 330 is connected by the conductor (not shown) to the conductive portion (not shown) of the terminal 44. If the embodiment of FIG. 6 is utilized, either the bracket 330 or the end fitting 348 may be appropriately modified to add thereto a stud, similar to the stud 90.

The affixing facility 74 includes a bracket 362 (which is the fuse mounting assembly 84 in FIGS. 5a-5e) carried by the insulator 82 and a latching mechanism 364 carried by the fuse 26 as an end fitting thereof. The bracket 362 is attached to the insulator 82 by bolts or the like (not shown) which are passed through a base 366 thereof. The base 366 carries a pair of spaced arms 368 (only one of which is shown in phantom). The arms 368 may be maintained apart an appropriate distance by a plate 370 connected therebetween. Each arm 368 carries a stud 372 on the inside surface thereof which extends a short distance away toward the other arm 368.

The latching mechanism 364 includes a cylindrical base 374 which is electrically and mechanically mounted to the end ferrule 86 (not shown in FIG. 13) of the fuse 26 in any convenient fashion. The cylindrical base 374 may, if desired, be attached to the fuse by trapping a feature (not shown) on the fuse ferrule 86 (not shown) between it and the exhaust control device 52 in the manner described and claimed in commonly assigned U.S. Pat. No. 4,158,830. When the base 374 is located between the arms 368, as depicted in FIG. 13, a locating member 376 carried by or formed integrally with the base 374 abuts the plate 370 and a lip or flange 378 of the locating member 376 engages an edge of the plate 370.

The base 374 carries or has formed integrally therewith a furcated support arm 380 (which is the stud contact assembly 88 of FIGS. 5a-5e). Pivotally and slidably mounted between the furcations of the support arm 380 is a tool-engageable member 382 (which is the pull-ring 326 in FIGS. 5a-5e). The tool-engageable member 382 contains a slot 384 positioned around a pin 386 which extends between the furcations of the support arm 380 and mounts a latch 388 at either end thereof. Each latch 388 is mounted on the outside of the support arm 380.

The tool-engageable member 382 is pivotally mounted on a pin 390 fixed between the furcations of the support arm 380 at an end thereof which mounts or has formed integrally therewith the stud 90. Clockwise rotation of the tool-engageable member 382 about the pin 390 (as viewed in FIG. 13) causes relative sliding of the slot 384 relative to the pin 386. The tool-engageable member 382 includes a hole 392 which may be engaged by a "shotgun stick" or a "hot stick" for rotation of the member 382 about the pin 390.

Generally forming the third apex of an imaginary triangle, the other two apexes of which are the hole 392 and the pin 390, is a V-shaped cam slot 394 formed in the tool-engageable member 382. Resting within the cam slot 394 is a V-shaped bridging bar 396 which is rigidly attached to and extends between the latches 388, only one of which is shown in FIG. 13. As previously noted, the latches 388 are pivotally mounted to the pin 386; the latches 388 are normally maintained in the positon shown in FIG. 13 by a spring 398 which is hooked over the bridging bar 396 near each latch 388. The spring 398 may extend from one end of the bridging bar 396, from there being coiled around the pin 386 several turns, and then extend to and across the left portion of the support arm 380. The spring then extends into the plane of FIG. 13, across the left surface of the support arm 380 and up to the pin 386, around which it is coiled again several turns and hooked over the bridging bar 396 near the other latch 388. In order to assure that the spring 398 does not shift or move and maintains a constant bias force on the briding bar 396 to bias the latches 388 to the position shown in FIG. 13, the support arm 380 may have formed integrally therewith spring locating protrusions 400.

The end of the latches 388 remote from the pin 386 are each formed into a hook 402 including a concave surface 404 which is designed to engage the studs 372 on the arms 368 of the bracket 362. Opposite the concave surface 404, each hook 402 includes a cam surface 406 for purpose to be described. Counterclockwise rotation of the latches 388 by the spring 398 is limited by engagement of the hooks 402 with stop surfaces 408 mounted to or formed integrally with the base 374.

The arms 368 of the bracket 362 need have no complicated nor expensive spring contact structure therebetween. Simply state, the function of the affixing facility 72 is merely to mechanically affix the end 26a of the fuse 26 relative to the insulator 82 and the panel 38. Electrical contact between the end ferrule 86 (not shown in FIG. 13) and the stationary electrical contact 92 is effected by engagement of the contact 92 by the stud 90 which is integrally carried by the support arm 380 on the base 374, which is in turn mounted to the end ferrule 86, as previously described.

In the orientation of the fuse 26 shown in FIG. 13, the fuse 26 is carried by the affixing facilities 72 and 74 as previously described. Specifically, engagement of the flange or lip 360 with the outside surface of the slideway 334 and the biasing of the fuse 26 rightwardly by the leaf spring 340, plus the engagement of the concave surfaces 404 of the hooks 402 with the studs 372 carried by the arm 368 mechanically mounts the fuse to the panel 38 in insulated, spaced relationship due to the presence of the skirted insulators 76 and 82. When the panel 38 is moved from its first position, as shown in FIG. 13, to its second position (viewing FIG. 13 upside-down), the fuse 26 may be removed from the affixing facilities 72 and 74 as follows. The hole 392 in the tool-engageable member 382 is engaged with a "shotgun stick" or a "hot stick" (not shown). Following this engagement, the "shotgun stick" or "hot stick" is manipulated to rotate the tool-engageable member 382 clockwise on the pin 390. Such rotation of the tool-engageable member on the pin 390 causes the slot 384 to move relative to the pin 386 and rotates the V-shaped cam slot 394 and the bridging bar 396 clockwise. Clockwise rotation of the bridging bar 396 rotates the latches 388 clockwise on the pin 386. Such clockwise rotation of the latches 388 ultimately disengages the concave surfaces 404 thereof from the studs 372, permitting the end 26a and the fuse 26 to be moved away from the affixing facility 74. The fuse 26 may then be lifted to remove the cylindrical portion 352 from the hole 358 to slide the enlarged cylindrical portion 350 out of engagement with the contact facilities (not shown) between the arms 344 of the contact 342.

After inspecting the fuse, it or a replacement may be re-inserted into the affixing facilities 72 and 74. Specifically, the cylindrical portion 352 is rested on the free end of the slide 336 while the hole 392 is engaged by a "shotgun stick" or a "hot stick." The cylindrical portion 352 may now be permitted to travel down the slide 336 until the flattened portions 358 of the cylindrical portion 352 enter the hole 338. Following this, the end 26a of the fuse is moved toward the affixing facility 74 until the cam surfaces 406 on the latches 388 abut the studs 372. As this abutment occurs, the enlarged cylindrical portion 350 moves between the arms 344 of the contact 342. The abutment of the cam surfaces 406 of the latches 388 causes them to be cammed by this engagement in a clockwise direction against the bias of the spring 398. Such camming continues until the hooks 402 of the latches 388 move under the studs 372 and the concave surfaces 404 again re-engage the studs 372 due to clockwise rotation thereof by the spring 398. Engagement between the hooks 402 and the stop surfaces 408 ensure that the cam surfaces 406 are in proper position for proper camming by engagement with the studs 372.

Following re-insertion of the fuse 26 into the affixing facilities 72 and 74, the panel may be moved from its second position (FIG. 13 viewed upside-down) back to its first position, as shown in FIG. 13 and FIG. 5a.

Conclusion

The mounting 20 of the present invention represents a distinct advance in the mounting art, especially as that art relates to the electrical gear art. Specifically, electrical gear 28 is provided in which fuses 26 or other electrical components mounted to the panels 38 are normally inaccessible and openings 36 through a wall 34 of the enclosure 24 are covered or blocked. The panels 38 may be manipulated and simultaneously moved and translated or pivoted end-for-end to render the fuses 26 or other electrical components attached thereto accessible. In the accessible position of the fuses 26, the openings 36 are again covered or blocked, thus achieving in both positions of the panels 38 and both locations of the fuses 26 the full advantages of physical isolation, whereby there are no significant points of ingress to the enclosure 24 via which energized live parts may be contacted.

Numerous variations of the above-described embodiments of the present invention are contemplated. Although the ring 268 may be located at either end 64 or 66 of the panel 38, it will be typically mounted to the end opposite that which is nearest to the rollers 100 or other members guided by the tracks 96. There are several reasons for this. First, because the end near or at which the rollers 100 are mounted moves generally coplanarly with the opening 36 in preferred embodiments, and because the opening is typically formed through a flat wall 34 which is vertical, location of the ring 268 and the rollers 100 at the same panel end may render manipulation of the panel 38 difficult. Specifically, with the ring 268 and the rollers at the same end of the vertical panel 38, manipulation of the panel 38 to achieve its simultaneous movement and end-for-end translation or pivoting requires application of essentially vertical forces to the ring 268. Application of such vertical forces by a workman using a "shotgun stick" or a "hot stick" and standing in front of the wall 34 will, in most cases, be impractical. However, if the workman is located above or below the wall 34, application of vertical forces to the ring 268 may be convenient, and in this event the ring 268 and the rollers 100 may be located at the same panel end. Also, the ring 268 and the rollers 100 may be at the same panel end, rather than at opposite ends, if the movement of the panel 38 is side-for-side rather than end-for-end, regardless of whether the wall 34 is vertical, horizontal or slanted, as well as if panel movement is end-for-end and the wall 34 is horizontal. Second, location of the ring 268 opposite from the rollers 100 minimizes entry into the enclosure 24 of the ring 268 and other portions of the main latch assembly 260. If the ring 268 is located at the same panel end as the rollers 100, when the panel 38 achieves the position shown in FIG. 5c, the ring 268 protrudes somewhat into the interior 56 of the enclosure 24. If the wall 34 and the enclosure 24 are not part of high-voltage gear 28, or if adequate clearance between the ring 268 (when the panel 38 is positioned as in FIG. 5c) and energized live parts of the high-voltage gear 28 is provided, the ring 268 may, if desired, be at the same panel end as the rollers 100. Further, if entry of some portion of the panel 38 into the enclosure is permissible, the ring 268 may be located at either end, although, again, location of the ring 268 at the end nearest to the rollers 100 may render inconvenient application to the panel 38 of the moving and end-for-end translational forces.

With the ring 268 and the rollers 100 located at opposite ends 64 and 66 of the panel 38, the path 126 followed by the end 66 of the panel 38 which mounts the ring 268, may be as shown in FIG. 7 or may be a variation thereof. Specifically, the path 126 will be as shown in FIG. 7 if the pivot rod 104 by which the links 102 attach the panel 38 to the wall 34 runs from the upper end of the wall 34 (above the opening 36) to the pivot rod 108. If the links 102 run from a pivot rod (not shown) at the lower end of the walls 34 (below the opening 36) to the pivot rod 108, the path followed by whichever the end 66 which mounts the ring 268 will be a mirror image of the path 126 (i.e., will be as though the path 127 was viewed upside-down and from behind FIG. 7). If the wall is slanted or horizontal, and whether movement of the panel is end-for-end or side-for-side, either the path 126 or its mirror image will be followed by the end 66 (or side) of the panel 38 mounting the ring 268 oppositely from the rollers 100. If, as described in the pevious paragraph, the ring 268 and the rollers 100 are at the same end (or side) of the panel 38, the panel end (or side) mounting the ring 268 will follow a path similar to the path 128 in FIG. 7 (i.e., generally coplanar with the opening 36), while the other end 66 or 64 (or side) of the panel 38 will follow the path 126 or its mirror image.

In the preferred embodiments, both the latch tip 246 of the interlock latch assembly 180 and the latch teeth 272 of the main latch assembly 260 selectively engage or disengage the lower latch plate 250. The interlock latch assembly 180 may be located so as to normally engage the top latch plate 264 instead. Further, although the main latch assembly 260 is shown mounted to the panel 38 near what has been denominated the second end 66 thereof, such main latch assembly 260 could be associated with the first end 64 of the panel 38 in a similar fashion.

As should be obvious, the panel 38 may mount articles or devices 22 on both of its surfaces 40 and 42. The devices 22 may be the same of different. In the first position of the panel (FIG. 5a) 38, the articles 22 mounted to the surface 40 will be inaccessible while those mounted to the surface 42 will be accessible. Movement of the panel to the second position (FIG. 5e) will reverse the accessibility of the articles 22. As an example, and assuming the mounting 20 is used with an enclosure 24 which forms a part of high-voltage gear 28, each surfce 40 and 42 of the panel 38 may mount a similar fuse 26. The fuse 26 mounted to the surface 40 will be inaccessible and in the orientation shown in FIG. 5a when the panel 38 is in its first position, while the fuse 26 mounted to the surface 42 will be accessible and in an upside-down orientation in front of the wall 34. Further, assuming the alternative embodiment of FIG. 6 is utilized, and that the affixing facilities 72 and 42 for both fuses 26 incorporate both stud contact assemblies 88 and 120, movement and end-for-end (or side-for-side) translation of the panel 38 to its second position (FIG. 5e) removes the fuse 26 mounted to the first surface 40 from interconnection between the stationary contacts 92 and 124 due to the disengagement of the associated stud contacts 90 and 122 therefrom. Movement of the panel 38 to its second position interconnects the fuse 26 mounted to the second surface 42 between the stationary contacts 92 and 124 due to engagement therewith of the associated stud contacts 90 and 122. In the second position of the panel 38, the fuse 26 on the surface 40 is accessible, while the fuse 26 on the surface 42 is inaccessible. This technique may be employed to provide quick, convenient replacement of an operated fuse 26 (on the surface 40) with a new, unoperated fuse 26 (on the surface 42).

The exact constructions of the terminal 44 and the electrical connector 46 are not crucial to the pesent invention and may take any convenient form. Moreover, although preferred constructions of the affixing facilities 72 and 74 and the stationary electrical contacts 92 and 124 have been described, such are also not crucial to the present invention. The structure of these and of other elements as indicated earlier may take any convenient form without departing from the spriit and scope of the present invention as set forth in the claims appended hereto.

We claim:

1. A mounting for an article which permits the article to be inaccessibly located in back of or accessibly located in front of a wall, the wall having an opening through which the article can be moved between its inaccessible and accessible locations, the mounting comprising:

a panel having first and second opposed ends and first and second opposed surfaces;

means for affixing the article to the first surface of said panel; and means for attaching said panel to the wall so that said panel may be simultaneously moved and translated end-for-end relative to the opening between a first position, in which the article and the first surface of said panel are inaccessibly located in back of the wall, and a second position, in which the article and the first surface of said panel are accessibly located in front of the wall.

2. A mounting as in claim 1, wherein:
the simultaneous movement and end-for-end translation of said panel occurs substantially in front of the wall.

3. A mounting as in claim 1, wherein:
said panel is configured to substantially block the opening when said panel is in either of its first and second positions.

4. A mounting as in claim 1, wherein:
said attaching means constrains a first portion of said panel to follow a path generally coplanar with, and the second end of said panel to follow a curvilinear path wholly in front of, the wall during the simultaneous movement and end-for-end translation of the panel.

5. A mounting as in claim 1 wherein the wall is a portion of a walled enclosure, the front of the wall facing outside the enclosure and the back of the wall facing the interior of the enclosure, whereby in the first position of said panel the article is located within the enclosure and in the second position of said panel the article is located outside of the enclosure.

6. A mounting as in claim 4, wherein said attaching means further comprises:
a first member attached to the first portion of said panel, and
guide means extending generally aong the opening for guiding said first member; and
link means having a first end pivotally connected to said panel and a second end pivotally connected to the wall.

7. A mounting as in claim 6, wherein:
said guide means is mounted to the wall and includes a track on either side of the opening in which said first member rides.

8. A mounting as in claim 6, wherein: said link means is pivotally connected to said panel at a location between the ends thereof and is at least as long as the distance between such location and the location at which said first member is attached to said panel.

9. A mounting as in Claim 8, wherein:
said link means is pivotally connected to said panel at a location generally midway between the ends thereof.

10. A mounting as in claim 6, wherein:
said panel has an axis of symmetry, and the end-for-end translation of said panel is about its axis of symmetry.

11. The mounting as claimed in claim 1, which further comprises:
main latch means on said panel for holding said panel in either of its first and second positions, said main latch means being manipulable between a latched state and an unlatched state, said main latch means permitting movement and end-for-end translation of said panel between its first and second positions only if said main latch means has been appropriately manipulated to its unlatched state to release said panel.

12. The mounting as claimed in claim 11, wherein:
said main latch means includes a member which is engageable by a tool in both positions of said panel to permit both manipulation of said main latch means between its latched and unlatched states and movement and translation of said panel by the use of the tool from a remote location.

13. The mounting as claimed in claim 12, wherein:
said tool engageable member is located near one end of said panel, and said main latch means further comprises:
first and second latch plates mounted to the wall, said first latch plate being engageable by said main latch means to hold said panel in its first position and said second latch plate being engageable by said main latch means to hold said panel in its second position.

14. An electrical apparatus including a mounting as claimed in claim 1 wherein the article is a electrical device having at least two electrical terminals and the mounting further comprises:
electrical connector means for connecting each terminal of the electrical device to a electrical circuit when said panel is in its first position with the electrical device in back of the wall and for disconnecting at least one terminal of the electrical device from the electrical circuit as said panel is moved and translated end-for-end from its first position to its second position with the electrical device in front of the wall, said electrical connector means being positioned so as to be disconnected from at least one terminal of the electrical device as the electrical device moves away from said electrical connector means as said panel is moved and translated from its first position.

15. Electrical apparatus as in claim 14, wherein the electrical device is a fuse and, further, wherein:
said affixing means affixes the fuse to the first surface of said panel in insulated, space relationship therefrom.

16. The electrical apparatus as claimed in claim 14 wherein said electrical connector means further comprises:
a stationary electrical contact for engaging a first terminal of the electrical device when said panel is in its first position with the electrical device in back of the wall, said first stationary electrical contact being positioned in back of the wall; and
an electrical connector selectively engageable and disengageable from a second terminal of the electrical device from the front of the wall while said panel is in its first position.

17. The electrical apparatus as claimed in claim 16 further comprising:
interlock latch means having a first orientation for preventing movement of said panel out of its first position and a second orientation wherein said interlock latch means does not restrict movement of said panel, said interlock latch means being moveable from its first orientation to its second orientation only while said electrical connector is disengaged from the second terminal of the electrical device.

18. A mounting arrangement for an article which permits the article to occupy a first, inaccessible position in back of a wall and a second, accessible position in front of the wall, the wall being flat and having a symmetrical opening therethrough, the opening having an axis of symmetry, the mounting arrangement comprising:
a panel having opposed first and second surfaces and an axis of symmetry between first and second ends, said panel having a shape and size capable of substantially covering the opening when said panel is in either of its first and second positions, the respective locations of the first and second ends of said panel when said panel is in the first position being displaced 180° from their respective locations when said panel is in the second position;

means for affixing the article to the first surface of said panel; and means for attaching said panel to the wall so that said panel can be selectively translated end-for-end about its axis of symmetry relative to the opening between its first and second positions, the article and the first surface of said panel being inaccessibly located in back of the wall and the second surface of said panel being in front of the wall when said panel is in the first position, the article and the first surface of said panel being accessibly located in front of the wall and the second surface of said panel being located in back of wall when said panel is in the second position, said panel substantially blocking the opening and the axes of symmetry of the opening and said panel substantially coinciding when said panel is in both its first and second positions.

19. A mounting arrangement as in claim 18, wherein: said attaching means includes means for constraining a portion of said panel near the first end thereof to follow a path generally coplanar with the opening during the end-for-end translation of said panel.

20. A mounting arrangement as in claim 19, wherein: said attaching means also includes means for constraining the second end of said panel to follow a curvilinear path wholly in front of the wall during the end-for-end translation of said panel.

21. A mounting arrangement as in claim 18, wherein: said attaching means includes means for constraining the first end of said panel to follow a curvilinear path wholly in front of the wall during the end-for-end translation of said panel.

* * * * *

UNITED STATES PATENT AND TRADEMARK OFFICE
CERTIFICATE OF CORRECTION

PATENT NO. : 4,463,227
DATED : July 31, 1984
INVENTOR(S) : Edmund S. Dizon and Joseph P. Moninski, Jr.

It is certified that error appears in the above-identified patent and that said Letters Patent are hereby corrected as shown below:

Col. 3, line 67, after "the panel," insert --the panel--.

Col. 6, line 18, "vice versa" should be --*vice versa*--.

Col. 8, line 68, "Ensa" should be --Esna--.

Col. 21, line 35, "24" should be --204--.

Col. 22, line 63, "29" should be --20--.

Col. 24, line 42, "position," should be --positions,--.

Col. 29, line 24, "briding" should be --bridging--.

Col. 29, line 39, "state" should be --stated--.

UNITED STATES PATENT AND TRADEMARK OFFICE
CERTIFICATE OF CORRECTION

PATENT NO. : 4,463,227
DATED : July 31, 1984
INVENTOR(S) : Edmund S. Dizon and Joseph P. Moninski, Jr.

It is certified that error appears in the above-identified patent and that said Letters Patent are hereby corrected as shown below:

Col. 31, line 51, "127" should be --126--.

Col. 32, line 9, "of" should be --or--.

Col. 33, line 30, "aong" should be --along--.

Signed and Sealed this

Twenty-first Day of May 1985

[SEAL]

Attest:

DONALD J. QUIGG

Attesting Officer

Acting Commissioner of Patents and Trademarks